(12) United States Patent
Eggert

(10) Patent No.: US 11,317,310 B2
(45) Date of Patent: Apr. 26, 2022

(54) METHOD FOR RADIO MEASURING APPLICATIONS

(71) Applicant: METIRIONIC GMBH, Dresden (DE)

(72) Inventor: Dietmar Eggert, Dresden (DE)

(73) Assignee: Metirionic GmbH, Dresden (DE)

(*) Notice: Subject to any disclaimer, the term of this patent is extended or adjusted under 35 U.S.C. 154(b) by 289 days.

(21) Appl. No.: 16/820,211

(22) Filed: Mar. 16, 2020

(65) Prior Publication Data
US 2020/0322828 A1 Oct. 8, 2020

Related U.S. Application Data

(63) Continuation of application No. PCT/EP2018/000435, filed on Sep. 17, 2018.

(30) Foreign Application Priority Data

Sep. 15, 2017 (DE) .................... 10 2017 008 647.8

(51) Int. Cl.
*H04W 24/10* (2009.01)
*H04W 72/04* (2009.01)
(Continued)

(52) U.S. Cl.
CPC ......... *H04W 24/10* (2013.01); *H04L 27/2634* (2013.01); *H04W 56/001* (2013.01); *H04W 72/0446* (2013.01); *H04W 72/0453* (2013.01)

(58) Field of Classification Search
CPC .......... G01S 13/84; G01S 5/0244; G01S 1/68; G01S 1/725; G01S 5/14; G01S 5/30;
(Continued)

(56) References Cited

U.S. PATENT DOCUMENTS 3,243,812 A  3/1966 Williams
5,969,674 A * 10/1999 von der Embse .... G01S 13/003
                                                342/357.2
(Continued)

FOREIGN PATENT DOCUMENTS

DE  10 2009 060 505 A1  7/2010
DE  10 2009 060 591 A1  7/2010
(Continued)

OTHER PUBLICATIONS

U.S. Appl. No. 16/820,201, filed Mar 16, 2020.
(Continued)

*Primary Examiner* — Brian T O Connor
(74) *Attorney, Agent, or Firm* — Muncy, Geissler, Olds & Lowe, P.C.

(57) ABSTRACT

A method for radio measuring applications, wherein at least two radio nodes operate at least once in a transmit mode and in a receive mode and form a cell and at least one radio node operates as an extra radio node works exclusively in a receive or transmit mode, each radio node has a timer and a further data interface, to initiate the measurement cycle, an initial signal with a first carrier frequency is transmitted by one of the radio nodes and received by at least one radio node of the cell, during the measurement cycle at least one radio node of the cell transmits a response signal with a further carrier frequency and the response signal is received by at least one radio node.

12 Claims, 12 Drawing Sheets

(51) Int. Cl.
*H04W 56/00* (2009.01)
*H04L 27/26* (2006.01)

(58) Field of Classification Search
CPC ........ G01S 5/02; G01S 5/0289; H04W 24/10; H04W 56/001; H04W 72/0446; H04W 72/0453; H04L 27/2634
See application file for complete search history.

(56) References Cited

U.S. PATENT DOCUMENTS

| | | | |
|---|---|---|---|
| 7,061,369 B2 | 6/2006 | Bergerhoff | |
| 7,286,624 B2* | 10/2007 | Woo | G01S 5/14 455/456.1 |
| 8,405,543 B2 | 3/2013 | Kluge et al. | |
| 8,406,144 B2 | 3/2013 | Sachse et al. | |
| 8,644,768 B2 | 2/2014 | Kluge et al. | |
| 9,001,878 B2* | 4/2015 | Pon | H04W 24/00 370/208 |
| 10,334,637 B2* | 6/2019 | Khandani | H04L 1/00 |
| 10,466,350 B2* | 11/2019 | Kluge | G01S 13/84 |
| 10,469,184 B1* | 11/2019 | Yu | H04J 3/0682 |
| 11,125,853 B2* | 9/2021 | Phillips | G01S 5/02 |
| 2005/0002481 A1* | 1/2005 | Woo | G01S 5/021 375/354 |
| 2009/0149198 A1 | 6/2009 | Nam et al. | |
| 2010/0074133 A1 | 3/2010 | Kim et al. | |

FOREIGN PATENT DOCUMENTS

| | | | |
|---|---|---|---|
| DE | 10 2009 060 593 A1 | 7/2010 | |
| DE | 10 2009 060 592 B4 | 6/2012 | |
| EP | 2 244 098 A1 | 10/2010 | |
| EP | 3 067 712 A1 | 9/2016 | |
| WO | WO 02/01247 A1 | 1/2002 | |
| WO | WO 2005/119379 A1 | 12/2005 | |

OTHER PUBLICATIONS

U.S. Appl. No. 16/820,228, filed Mar 16, 2020.
Rick Roberts, "TDOA Localization Techniques," IEEE 802.15-04a/572r10, Presentation, pp. 1-11 (Oct. 4, 2004).

* cited by examiner

METHOD FOR RADIO MEASURING APPLICATIONS

This nonprovisional application is a continuation of International Application No. PCT/EP2018/000435, which was filed on Sep. 17, 2018, and which claims priority to German Patent Application No. 10 2017 008 647.8, which was filed in Germany on Sep. 15, 2017, which are both herein incorporated by reference.

BACKGROUND OF THE INVENTION

Field of the Invention

The present invention relates to a method for radio measuring applications having at least three radio nodes for determining a transfer function and/or a time offset between the radio nodes.

Description of the Background Art

There are a variety of methods for determining distance based on the measurement of phases and phase differences of reference signals in the frequency domain. The basic principle has been known for more than 50 years, for example from U.S. Pat. No. 3,243,812. The method has been used in various applications for decades. In addition to a large number of publications, there are also a number of patents.

DE 10 2009 060 505 B4 describes a method for communication between two radio nodes, wherein the radio nodes mutually transmit and receive signals and the carrier frequencies of the signals are changed for each repetition. The phase values extracted from the second radio node are subsequently transmitted back to the first radio node and then evaluated together with the received signals of the first radio node to determine a distance between the two radio nodes.

DE 10 2009 060 593 A1 discloses a further method for measuring the distance between two radio nodes, wherein the radio nodes exchange unmodulated carrier signals, each radio node identifies two phase values for two frequencies and the distance between the radio nodes is determined from the total of four phase values.

Alternative methods for distance measurement between two radio nodes are known from DE 10 2009 060 592 B4, WO 02/0127A2, US 2009/0149198 and DE 10 2009 060 591 A1.

From WO 2005/119379 A1, a method is known for jitter correction, wherein a first radio node receives a response signal from a second radio node to a transmitted initial signal and the response signal itself contains both the reception time of the initial signal determined by the second radio node and the transmission time of the response signal thereof.

From "TDOA Localization Techniques", Rick Roberts, IEEE 802.15-04a/572r0, October 2004, methods for determining the position, for example by means of time difference of arrival, are known.

SUMMARY OF THE INVENTION

It is therefore an object of the present invention to provide a method which further develops the prior art.

According to an exemplary embodiment of the invention, a method for radio measuring applications with at least three radio nodes is provided, wherein at least two radio nodes form a cell during a measurement cycle, at least one further radio node is an extra radio node and the measurement cycle comprises at least two steps.

During the measurement cycle, at least two radio nodes of the cell operate at least once in one of the at least two steps in a transmit mode and at least once in one of the at least two steps in a receive mode. The at least one extra radio node exclusively operates during the measurement cycle in a receive mode or exclusively in a transmit mode.

Each of the radio nodes has its own timer and a further data interface for data transfer.

In each case, there is a time offset between the timers.

During each measurement cycle, at least all the transmission signals of the cell's radio nodes are mutually coherent.

To initiate the measurement cycle, the initial signal is transmitted with a first carrier frequency in the first step by one of the radio nodes in the transmit mode and received by at least one radio node of the cell in the receive mode.

During the measurement cycle, in at least one further step, at least one radio node of the cell changes from the receive mode to the transmit mode and transmits the response signal with a further carrier frequency, wherein the response signal is received by at least one radio node of the cell in the receive mode.

During the measurement cycle, at least one of the extra radio nodes receives at least one signal or sends at least one signal.

At least two measurement cycles are carried out on different carrier frequencies.

The method operates either in a first mode or in a second mode, wherein in the first mode, each response signal is formed at least from a portion of the received initial signal or a portion of a received response signal and at least one transfer function and/or at least one of the time offsets is determined based on the received response signals.

In the second mode, each response signal is independently formed from each received signal, at least two received initial signals are transmitted by means of the further data interface and at least one transfer function and/or at least one of the time offsets is determined from the received response signals and the at least two received and transmitted initial signals.

Each radio node can comprise a receiving unit, a transmitting unit, a signal processor, the further data interface and at least one antenna. Furthermore, it is understood that only one radio node transmits in one step.

If a radio node comprises several antennas, the initial signal and/or the response signal is sent by one of the antennas or the initial signal and/or the response signal is emitted by several antennas. For example, the antennas radiate sequentially in succession during a transmission period. To this end, the transmission period is, e.g., divided into several time windows, wherein in each case one of the antennas transmits during a time window. It is understood that the reception of the signals can also be organized accordingly.

According to the invention, the cell comprises at least two radio nodes and can be expanded by further radio nodes. In addition, there is at least one extra radio node available as an extra radio node. The arrangement can also be expanded by extra radio nodes. The at least one extra radio node or all extra radio nodes are not part of the cell.

The data interface can be formed wired or wirelessly and enables the exchange of data, for example of determined signal vectors, as well as the rough synchronization of the radio nodes. It should be noted that the design of the data interface is not the object of the present method.

Using the method, time offsets between the individual timers and/or transfer functions can be determined. The prerequisite is that the signals are coherent at least during the measurement cycle.

The transfer function represents the transfer properties between two radio nodes in the frequency domain, that is, the transfer of a signal over a propagation medium, and is a term generally used in the field of wireless data transmission. In many cases, the transfer function is also called system function.

It is understood that the recorded values can be transformed from the frequency domain to the time domain by means of a Fourier transform. In the time domain, the term channel impulse response is also used for the transfer behavior of a propagation medium.

The method comprises a first and a second mode, each mode being closed on its own. Decisive for mode 1 is that additional information within the signal exchange is transmitted within the measurement signal, whereas mode 2 uses only the data interface for the transmission of this information. A system operates in each case in one of the modes within a period of time. Transition between the nodes is possible.

By means of the method, it is possible to carry out a transfer function for the propagation behavior of a propagation medium from one radio node to another radio node (also referred to as 1WR one-way transfer functions) or for a cycle, i.e. a transfer from one radio node to the further radio node and back (also known as 2WR two-way transfer function).

From the measurement of the transfer function in the frequency domain, distance differences and/or distances between the radio nodes involved can be determined.

The phase response between the signals is particularly important. If the propagation behavior is dominated within a medium by the direct path, then the group delay $t_g$ of the electromagnetic wave can be determined from the phase response using a derivation.

$$t_g = \frac{d\varphi}{d\omega}$$

The speed of propagation c of the electromagnetic wave creates a direct relationship to the distance d between the radio nodes corresponding to $d = c \cdot t_g$.

Characteristic of all measuring methods is the mutual transmission and reception of reference signals, i.e. of the initial signal or the at least one response signal, wherein each radio node evaluates the position of the received signal in the complex plane with respect to its own internal time reference.

A measurement cycle from the first step and at least one further one step represents a core operation of the method, which is also referred to as atomic operation or ping-pong.

In the first step, the initial signal is sent by a radio node of the cell or by an extra radio node.

If the initial signal is sent in the first step by an extra radio node, each measurement cycle comprises at least two further steps, wherein in the further steps in each case a radio node of the first unit sends a response signal.

The phase coherence of the signals must be preserved at least over a measurement cycle, i.e., a core operation must be preserved at least within the cell.

Maintaining the phase coherence of the signals over a limited period of time and between the radio nodes is an important property of the method and a prerequisite for a reconstruction of the signal curve.

Depending on the embodiment, the coherence requirement can be extended to several measurement cycles.

The transmission channel is characterized in many cases by several paths, wherein in addition to the direct connection between two radio nodes further paths can also be created through reflection on objects and/or through refraction and/or through diffraction.

In order to resolve several paths in the received signals, the measurement cycle, i.e. the mutual sending and receiving of signals, is repeated several times in frequency steps over a bandwidth (predetermined frequency range). In this way, the transfer functions can be determined based on a number of interpolation points in the frequency domain.

The bandwidth of the predetermined frequency domain determines the ability of the method to resolve signal paths having different lengths. Since it is a discrete-frequency representation, the frequency step size determines the range over which a distance can be clearly determined and at the same time limits the size of the clearly definable time offsets.

In addition to distances or distance differences, it is also possible to extract further parameters, for example an angle of incidence between radio nodes (two or more) for a relative position determination. To this end, the received signals of multiple antennas are evaluated or the transmit signals are distributed to several antennas in a determined manner. This can be done in parallel/simultaneously by using several transmitting and receiving units. Alternatively, the antenna assignment can be carried out one after the other on different time windows within the sequence of steps and by switching the antennas between the time windows. Appropriate settling processes must be observed when switching over.

The predetermined frequency domain preferably corresponds, for example, to the frequency domain available, that is to say, depends on the bandwidths made available by the radio nodes used. As an alternative, the technically possible frequency domain is limited due to legal requirements and/or due to actual use, so that the predetermined frequency domain comprises only a partial range of the available frequency domain.

Each radio node follows a fixed time sequence that is firmly linked to the timer and the corresponding cycle controller and therefore deterministic. This means that all function blocks have a fixed time and phase relationship over the required time periods and meet the respective requirements for phase coherence. Since the time behavior of the radio nodes among the nodes is known a priori (with the exception of the initial phase position, time and frequency offset), there is a coherence relationship between the radio nodes.

For the execution of the procedure of the method it is important, however, that the corresponding transmission and reception periods (possibly also transmission and reception time windows) oppose one another and that the corresponding settling processes are completed, i.e., a steady state is established.

The tolerable variation in the time offset secured by a rough synchronization is based on the magnitude of the measurement range, and should be, for example, 1 µs in a range of less than 300 m in order to avoid increased expenditure in time and frequency offset correction. The achievable measuring accuracy in the 2.4 GHz range is less than one 1 m.

Concerning this characteristic, this method differs significantly from established UWB TDOA (Time Difference of Arrival) methods. Since the measurement accuracy is determined by the synchronization, the synchronization quality must be better than 3 ns with comparable accuracy.

As noted, each radio node has its own time reference. The time reference is preferably a crystal oscillator (XTAL/XOSC). It is understood that the rough time comparison does not replace the determination of the actual time offset for a core operation but is a prerequisite.

An advantage is that the flexibility of the method and reliability increase. Another advantage is that the method can be carried out faster and more cost-effectively. In particular, the method can be used advantageously when determining the position of radio nodes in the area of the sensor networks. Furthermore, the procedure allows for high-resolution distance measurements to be carried out over large ranges, i.e., over a range of 0.5 m to 10 km. In particular by means of using narrowband architectures, i.e., channel filter bandwidth smaller than 1 MHz, a high dynamic range and high interference immunity are achieved.

The determination of the time offset, or the time offset of two radio nodes involved in the communication, is important for further processing of the measurement results.

Any other kind of data exchange is referred to as the data interface, for example, a communication protocol for a wireless exchange, e.g. Bluetooth, Zigbee or IEEE 802.11, which allows for an exchange of data frames for rough synchronization. Alternatively, the data interface can be formed as a data line or a connection for a data line.

If according to the first mode each response signal is formed from at least a part of the received initial signal, then corresponding information is transmitted back or further over the received initial signal or a received response signal. Each response signal formed in accordance with the first mode thus contains information about at least two paths.

If according to the second mode each response signal is formed independently from the initial signal, then according to a first alternative embodiment at least one determined, received signal vector is transmitted by means of the data interfaces of the corresponding radio node to a further radio node or an arithmetic unit.

If the time offset is determined on the basis of at least one initial signal and at least one response signal, it is possible to determine the 1WR transfer function. This is possible both in the first mode and in the second mode.

An advantage of the first mode of the inventive method is thus that an additional data exchange of measurement results is eliminated. This way, both the technical and the time expenditure can be reduced.

At least three radio nodes can be provided in the cell, wherein each of said at least three radio node transmits in at least one step and receives in all further steps, wherein in each step, only one of the radio nodes transmits.

All radio nodes in the cell can be designed to work in a receive mode and in a transmit mode and during at least one measurement cycle, at least one of the radio nodes of the cell operates neither in transmit mode nor in receive mode.

This makes it possible to provide extra radio nodes as a backup or to use additional or different radio nodes during other measurement cycles. For example, in successive measurement cycles, two different radio nodes of the cell are always active and form a radio node pair, wherein the radio node pair in each case exchanges an initial signal and a response signal.

In a further development, several extra radio nodes are provided.

In another development, the position of one of the radio nodes within the cell is determined by means of several measurement cycles.

The position of one of the extra radio nodes is determined by means of several measurement cycles. An extra radio node working exclusively in receive mode determines distance differences on the basis of the signals received. It is also possible to use several measurement cycles to determine the absolute position of the extra radio node on the basis of the multiple distance differences.

In a further development, a measurement run is formed from several repetitions of the measurement cycle and at least one first radio node is part of the cell in at least one first measurement run and operates as an extra radio node in at least one further measurement run and/or at least one further radio node operates as an extra radio node in at least one first measurement run and is part of the cell in at least one further measurement run.

Switching the functionality of the radio nodes from measurement run to measurement run increases the flexibility and/or reliability of the method. It also enables calibration procedures.

The radio nodes of the cell can be arranged at specified positions.

The radio nodes of the cell serve as anchor nodes, while the at least one extra radio node is arranged to be mobile or movable and serves as a tag. Using the signals received or transmitted by the extra radio node, for example, distance differences or accumulated paths are determined. If the cell comprises at least three radio nodes with a known position, it is possible to determine a three-dimensional position of the at least one extra radio node.

An operating mode with at least one extra node operating exclusively in transmit mode can also be called blink mode. An operating mode with at least one extra node operating exclusively in the receive mode is also referred to as GPS mode. It is understood that several corresponding extra nodes can also be provided or used for both operating modes.

By providing extra radio nodes which also only operate in the receive mode, the number of distances measured within a measurement cycle or a measurement run can be expanded. A further distance value is created for each extra radio node. A great advantage of this embodiment variant is that the number of steps within a measurement cycle does not have to be expanded. The measuring speed can thus be significantly increased by adding extra radio nodes.

At least one first radio node extra operates exclusively in the transmit mode and at least a second radio node exclusively in the receive mode, wherein the second radio node is arranged at a specified position.

This example is an expansion of the blink mode (at least one transmitting extra node as a mobile tag, at least two nodes in the cell as anchor nodes) using at least one second extra radio node that operates exclusively in the receive mode. Due to the known position of the second extra radio node, the latter serves as a passive anchor node.

All radio nodes can be arranged at a predetermined position.

This makes it possible to determine all time offsets, that is to say, the time offsets between all the involved radio nodes. This can be used for calibration, for example.

The at least one extra radio node and at least one first radio node of the cell can be arranged in a predetermined position and at least one extra radio node operates exclusively in a receive mode.

This operating mode can also be referred to as hybrid mode and enables in particular the determination of distances between radio nodes. The at least one extra radio node and at least the first radio node of the cell serve as anchor nodes, whereas at least a second radio node of the cell is mobile and serves as a tag node. Advantageously, several extra nodes are provided. All path differences, accumulated paths and/or distances to the extra nodes are determined, from which a relative or absolute position of the mobile radio node of the cell can be deduced.

A measurement run can be formed from several repetitions of the measurement cycle, wherein the initial signal and each response signal in each case are coherent at least during a measurement run or at least during several measurement runs.

A complex signal vector can be determined in the first mode from the received initial signal or from one of the received response signals, and the response signal to be transmitted is derived from the complex signal vector or from the reciprocal of the complex signal.

In the first mode, a signal vector can be determined from the received initial signal or from one of the received response signals and the response signal to be sent is formed using the conjugate complex signal vector.

According to a further alternative, in the first mode, a phase can be determined from the received initial signal or from one of the received response signals and the response signal to be transmitted is formed using the phase or the inverted phase.

A measurement run can be formed of several repetitions of the measurement cycle and the first carrier frequency of the first transmission signal assumes a predetermined value within the frequency domain with each repetition during the measurement run.

For example, a frequency sweep is performed, wherein the first carrier frequency is increased or decreased by a constant value within the specified frequency domain with each repetition during the measurement cycle. A sweep can be implemented with little implementation effort. It is usually easier to maintain phase relationships across a variety of smaller frequency steps. Because of legal regulations, however, this version is restricted for many applications due to the permissible transmitting power.

A more irregular change in frequency is also known as frequency hopping. The different frequencies or values for the carrier frequency for each individual repetition are stored, for example, in a lookup table or are based on a predefined mathematical function. For example, frequency hopping can be carried out on the basis of pseudo-noise-like sequences, which results in a high level of robustness against sources of interference. At the same time, this embodiment of the method allows for the use of larger transmitting power while complying with a wide variety of legal provisions and regulatory requirements. It is therefore possible to expand the use of the method to larger ranges.

Each further carrier frequency can correspond to the first carrier frequency or each further carrier frequency differs from the first carrier frequency.

The temporal course of the carrier frequencies or the frequency changes are known in advance to the radio nodes involved. For example, the second carrier frequency is always changed in accordance with the first carrier frequency.

The second carrier frequency can be changed independent of the change in the first carrier frequency or not at all. The change, i.e., the frequency step made in a repetition, is the same for each repetition or changes for each repetition, for example according to a predetermined list or mathematical function known to all radio nodes, which also includes the temporal behavior and thus maintains the required phase coherence.

A multipath analysis can be carried out for at least one determined transfer function.

A filter can be applied to the received signal initial/or the at least one received response signal.

According to a further embodiment, in addition to the carrier frequency of the response signal, an amplitude and/or a phase of the response signal is changed for each repetition of the measurement cycle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
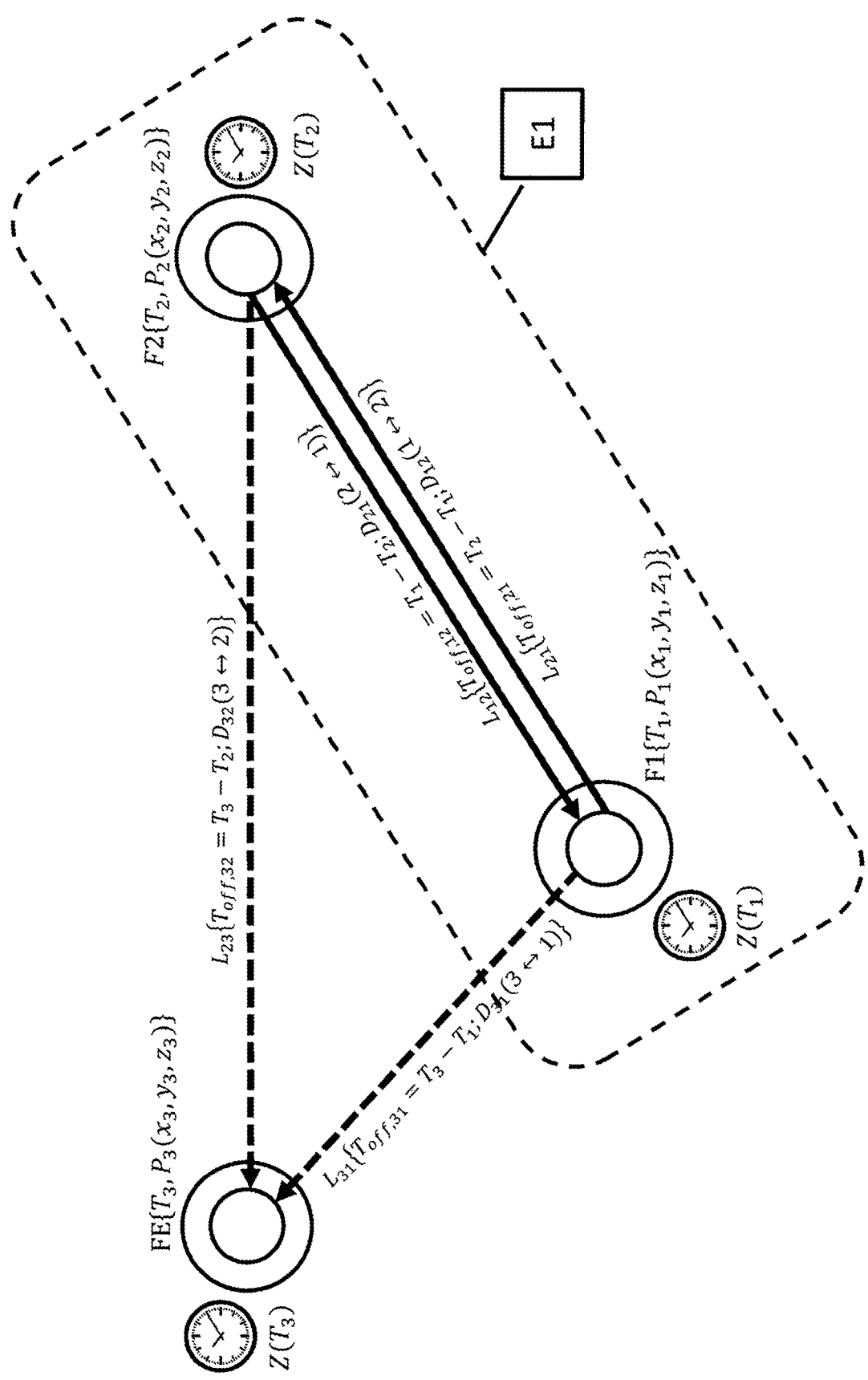
FIG. 1 shows an arrangement of three radio nodes for radio measuring applications according to an exemplary embodiment.

FIG. 1 shows an arrangement of three radio nodes F1, F2 and FE for carrying out a first embodiment of a method according to the invention for radio measurement applications, wherein the arrangement is designed to run a first mode of the method according to the invention.

Each of the radio nodes has its own timer Z(T1) or Z(T2) or Z(T3), the timers respectively specifying the time base T1, T2 or T3 of the respective radio node F1, F2 or FE and the timers Z(T1), Z(T2) and Z(T3) each being independent of each other. The timers are each designed as crystal oscillators. It is assumed that the different timers Z(T1) or Z(T2) or Z(T3) progress in the same units (for example, determined by the frequency of an internal clock), so that the differences in the time bases T1, T2 and T3 can each be reduced to one time offset. (A possible frequency offset between the timers is excluded by further considerations. In the case of a frequency offset, corresponding corrective measures are taken to correct the frequency offset.)

The time offset between the radio nodes is the offset between the respective timers and is direction-dependent, wherein in the further considerations, the sending radio node should always be used as the reference node: If the first radio node F1 is the sending node and the second radio node F2 the receiving node, then the corresponding time offset is $T_{off, 21}=T2-T1$. The time offset in the reverse direction is $T_{off, 12}=T1-T2$, wherein $T_{off, 21}=-T_{off, 12}$. Including the extra node FE results in a further time offset $T_{off, 31}=T3-T1$, wherein here, the following also applies: $T_{off,31}=-T_{off, 13}$. At the same time, a third time offset $T_{off, 23}=T2-T3$ between the second node F2 and the extra radio node FE is created. The third time offset can also be determined by the accumulated time offset of the extra radio node FE over the first node F1 to the second radio node F2 with $T_{off,23}=T_{off,21}+T_{off, 13}$. The following applies analogously: $T_{off,32}=T_{off, 12}+T_{off,31}$.

The radio nodes F1, F2 and FE are located at positions P1, P2 and P3, which, for example, are fixed by means of their x, y and z coordinates within a Cartesian coordinate system as P1 $(x_1, y_1, z_1)$, P2 $(x_2, y_2, z_2)$ and $P_3 (x_3, y_3, z_3)$. Depending on the embodiment, the positions of the individual radio nodes are at least partially known or also to all radio nodes. Radio nodes whose positions are known are also referred to below as reference radio nodes. Radio nodes whose position is not known are also referred to as tag nodes in the following.

The method in different embodiments allows for the determination of transfer functions and time offsets. An analysis of the transfer functions enables the determination of distances.

In connection with measuring methods for two radio nodes, a one-way transfer function (1WR) and/or a two-way transfer function (also circulation transfer function or 2WR) can be used to determine distances.

Distances between the radio nodes result from the coordinates, for example for the distance between the radio nodes F1 and F2:

$$D_{12}=\sqrt{(x_1-x_2)^2+(y_1-y_2)^2+(z_1-z_2)^2}$$

It is understood that the distances considered are calculated based on extracted transit times of signals. Any delays within the transmitting and receiving units extend the signal transit time and are reflected in the extracted distances. These have to be corrected by appropriate calibrations.

In the interaction of a plurality of radio nodes, there is the additional possibility of determining path difference transfer functions and transfer functions related to the accumulated path, which directly contain the difference in the length or the sum of two paths from the perspective of a third node. For example, $D^3_{12(-)}$ is the path length difference of the path length between the extra radio node FE and the first radio node F1 as compared to the path length between extra radio node FE and the second radio node F2: $D^3_{12(-)}=D_{31}-D_{32}$.

The accumulated path from the first radio node F1 to the extra radio node FE via the second radio node F2 is: $D^2_{31(+)}=D_{32}+D_{21}$. If there are more than 3 radio nodes, the options expand accordingly.

The two radio nodes F1 and F2 form a cell E1, wherein during a measurement cycle both the first radio node F1 as well as the second radio node F2 operate at least once in a transmit mode and at least once in a receive mode, while the extra radio node according to the exemplary embodiment shown exclusively operates in the receive mode during the measurement cycle. A measurement cycle includes sending an initial signal and sending at least one response signal.

Figure 2:
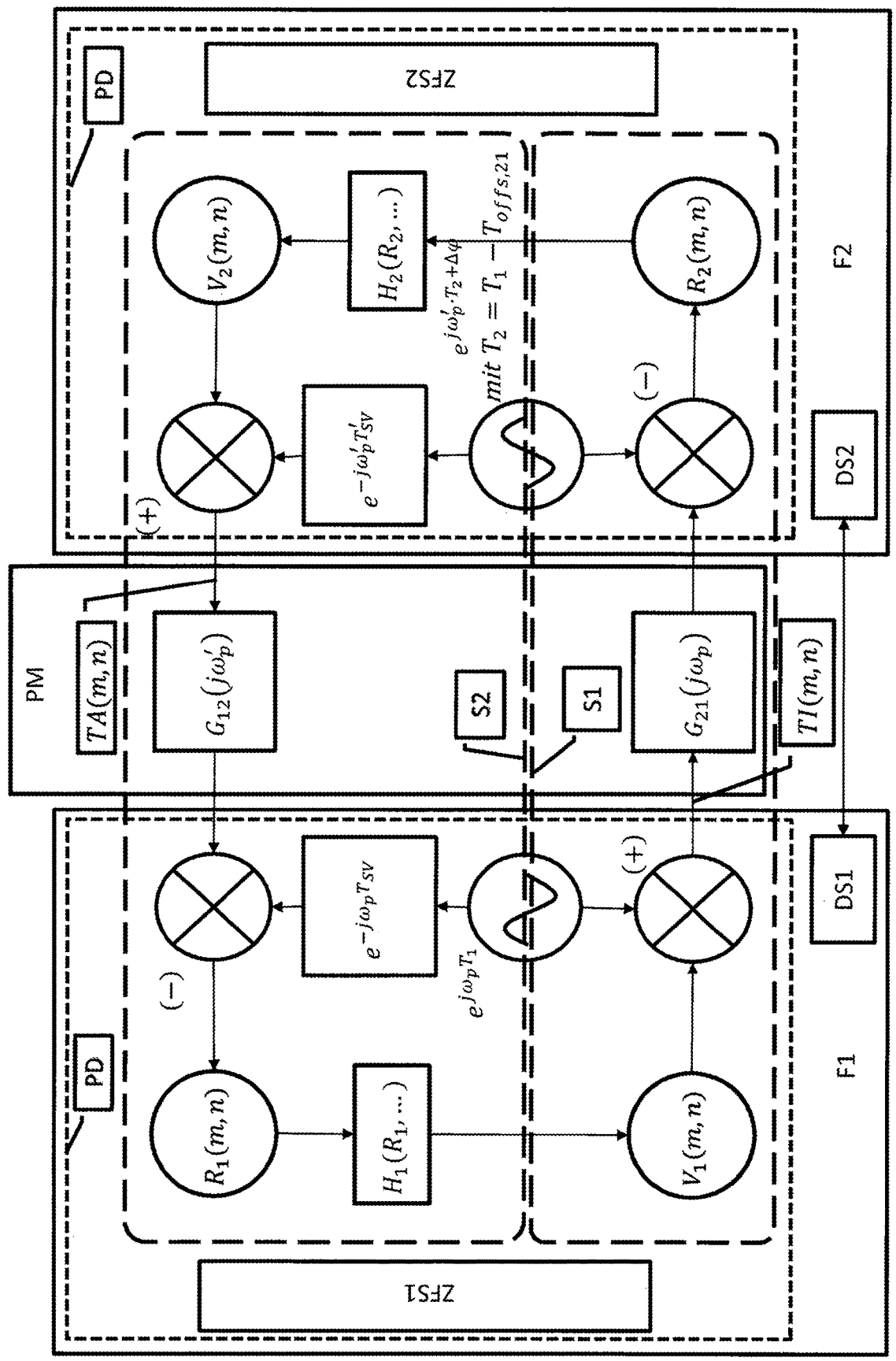
FIG. 2 illustrates a representation of two radio nodes forming a cell in functional units and their essential properties.

The structure of the radio nodes of the cell E1 or the respectively essential signal processing operations and corresponding function blocks are shown in FIG. 2.

The radio nodes F1 and F2 each have a receiving unit RX, a transmitter unit TX, and a data interface DS1, DS2, wherein each data interface DS1 and DS2 supports a communication protocol for wireless data exchange.

As shown in FIG. 2, the radio nodes F1 and F2 of the cell E1 in the illustrated embodiment also have a frequency generator, an up-mixer, a downward mixer, a function block H1 and H2, respectively, and a time and frequency controller ZFS1 or ZFS2 comprising the timer Z(T1) or Z(T2).

The up-mixer uses the frequency generator to convert a complex signal vector V1 or V2 from the baseband position to the HF position. The downward mixer converts a high-frequency signal into a signal vector R1 or R2 into the baseband position.

The function block H1 or H2 uses a function also referred to as H1 or H2 to generate a complex transmit vector V1 or V2 from the receive vectors R1 or R2 and/or the parameters, which are provided via the respective data interface DS1 or DS2, for the further generation of a corresponding transmission signal $T_1$ (m, n) and $T_2$ (m, n).

The transmission signals TI and TA are transferred via the propagation medium PM. The transfer functions $G_{12}$ and $G_{21}$ for the respective direction of propagation characterize the influence of the propagation medium PM on the transmission signals TI or TA. $G_{12}=G_{21}$ applies for a typical radio channel.

The time and frequency controller ZFS1 or ZFS2 controls all system state changes in a fixed time regime. The time controller operates on the basis of a time unit $T_{MU}$ and ensures that all relevant changes of state (sampling and subsampling of the signal vectors V1 and V2, transitions from the transmit mode to the receive mode as well as from the receiving mode to the transmit mode) and frequency changes are firmly connected with the related time base and can be based thereupon.

The time and frequency control ZFS1 or ZFS2 is also responsible for ensuring that the coherence between the signals is maintained along the required length, that is, that settling processes are taken into account and all function blocks are located in linear control areas also in the transition areas (including frequency generator, PLL). The radio nodes F1 and F2 are controlled by the time and frequency control ZFS1 and ZFS2 during the measurement cycle. In the shown embodiment, the measurement cycle includes two steps S1 and S2. This also includes the transition areas (step delay), which are shown as delay elements of the value $T_{SV}$. The time and frequency control ZFS1 or ZFS2 also assumes control of the frequency $\omega_p$ over an available frequency domain.

As a result, the time and frequency control ZFS1 and ZFS2 in each case generate a phase-coherent domain PD in which the high-frequency synthesis, the generation of the corresponding transmit vectors and the extraction of the receive vectors have a fixed relationship to one another on the live end.

It is understood that the above-described does not exclude that before coupling out in a further mixer, an intermediate frequency is achieved by multiplication with an auxiliary carrier, often referred to as a local oscillator, before the signal is finally converted by converting to the actual target frequency $\omega_p$. The same applies for the receiving process. The received high-frequency signal can also first be converted into an intermediate frequency level and then into the so-called baseband.

It is also understood that the method includes that the transmit signal is formed in a direct-conversion architecture, while the receiving unit operates at a low intermediate frequency. As a consequence, the corresponding transmission signals are shifted to each other by an intermediate frequency $f_p = f'_p \pm f'_{IF}$.

The corresponding sequences of the method for radio measurement applications according to the first alternative embodiment are explained with reference to FIGS. 3 and 4.

In contrast to the radio nodes F1 and F2 of the cell E1, as shown, for example, in FIG. 2, the extra radio node FE does not have to include a transmitter unit TX and an up-mixer to generate a transmit signal since the extra radio node FE operates exclusively in the receive mode according to the exemplary embodiment shown.

The transmitter unit TX is therefore optional and shown in dashed lines in the illustration. Otherwise, the extra radio node FE in the exemplary embodiment shown is constructed in exactly the same way as the two radio nodes F1 and F2 of the cell E1.

Figure 3:
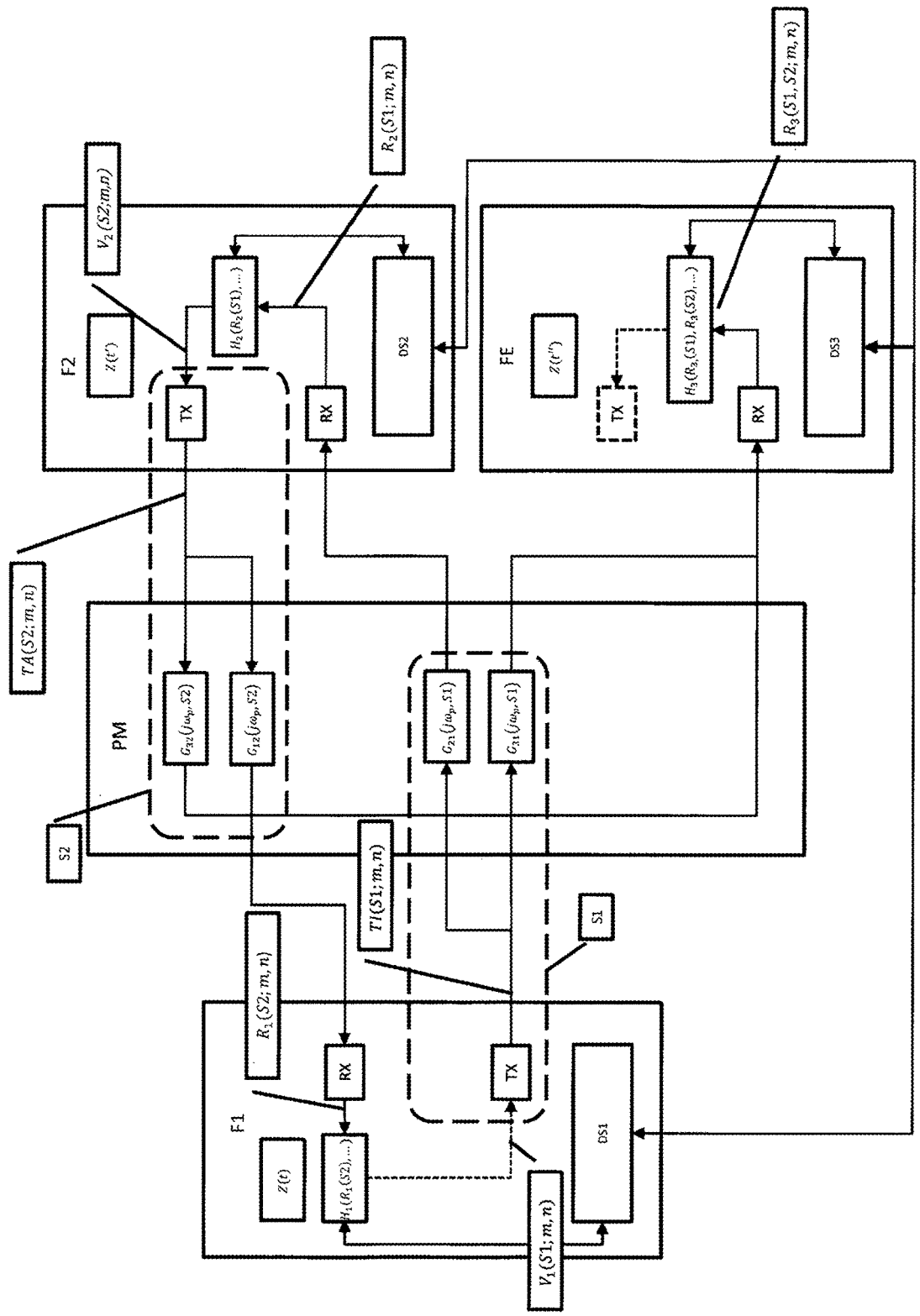
FIG. 3 illustrates a representation of the functional unit of the three radio nodes according to the first embodiment.
Figure 4:
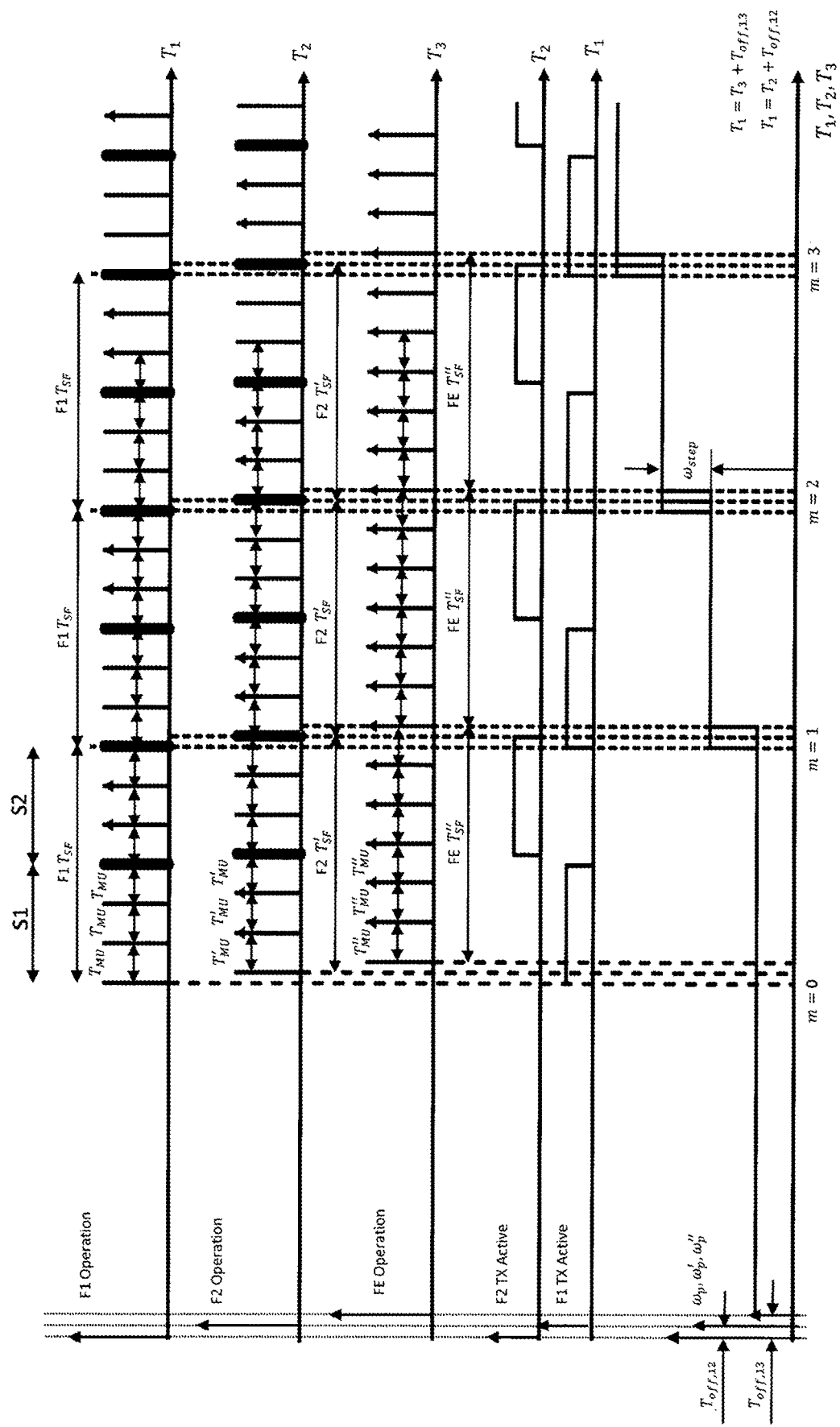
FIG. 4 shows a temporal flowchart according to the first embodiment according to the invention.

FIG. 3 and FIG. 4 show the operation of the radio nodes F1, F2 of the cell E1 in connection with an extra radio node FE, which operates only in the receive mode. While FIG. 3 highlights the interaction of the radio nodes with the propagation medium PM, FIG. 4 shows the timing.

In the upper part of FIG. 4, the operation of the individual radio nodes F1, F2 and FE is shown. The arrows each represent a sample and a sample time of a received vector. Bars in bold mark a transition from the receive mode to the transmit mode and vice versa. The lines without an arrow illustrate the parallel running of the respective timer or the preservation of the respective time base even while a radio node is in the transmit mode. The corresponding transmission time periods, in each of which the continuous-time transmission signal is generated and emitted are shown in the middle graphs. In the exemplary embodiment shown, only the radio nodes F1 and F2 of the cell E1 transmit.

In the lower part of FIG. 4, the course of the carrier frequency $\omega_p$ is shown. All radio nodes F1, F2 and FE operate in their own time base T1, T2 and T3, as specified by the respective timer Z(T1), Z(T2) and Z(T3), each with their own time unit $T_{MU}$, $T'_{MU}$ or $T''_{MU}$, on the basis of which all actions take place. The time units $T_{MU}$, $T'_{MU}$ or $T''_{MU}$ or the respectively defined step size is continuously maintained through the measurement run comprising several repetitions of the measurement cycle up to multiple measurement runs.

The time axes T2 of the second radio node F2 or T3 of the extra radio node FE are shifted by the time offset $T_{offs, 12}$ or $T_{offs, 13}$ with respect to the time axis T2 of the radio node F1.

In FIG. 4, n denotes the index within a measurement cycle, which has a duration of $T_{SF} = n_{max} * T_{MU}$. The index has a range of values n=0, 1, ..., ($n_{max}$−1), wherein $n_{max}$ has been determined from the specific design of the measurement cycle and $n_{max}$=6 was selected in the example shown. As shown in FIG. 4, n in connection with the measurement unit time $T_{MU}$ forms the basis for a discrete-time system based on $t = n*T_{MU} + m*T_{SF}$. Here, m denotes the index of the measurement cycles of a measurement run, wherein in this case the frequency of the frequency generators, i.e., the respective carrier frequency, is changed at the beginning of each measurement cycle. The index m has a range of values m=0, 1, ..., ($m_{max}$−1). $m_{max}$ is determined by the specific design and depends, among other things, on the number of frequencies for which a transfer function is to be determined. To distinguish the corresponding values of the individual radio nodes F1, F2 and FE, all values are color-coded (e.g. for the frequencies: F1: $f_p$, F2: $f'_p$, FE: $f''_p$).

Each radio node forms a discrete-time system in itself with $T1 = n*T_{MU} + m*T_{SF}$, $T2 = n*T'_{MU} + m*T'_{SF}$ or $T3 = n*T''_{MU} + m*T''_{SF}$.

As shown in FIGS. 3 and 4, radio node F starts to transmit an initial signal TI during a first step S1 m=0, n=0, 1, 2 by means of the transmitting unit TX over a propagation medium PM, for example, air. The effect of the propagation medium on the transmission signal is shown by the corresponding transfer functions $G_{21}$ ($j\omega_p$; S1) or $G_{31}$ ($j\omega_p$; S1).

During the first step S1, the second radio node F2 (as part of the first cell) and the extra radio node FE are designed to receive the initial signal TI as a receive vector $R_2$ (S1; m, n) or $R_3$ (S1; m, n) emitted by the first radio node F1 after a transmission via the propagation medium PM.

All radio nodes are designed to exchange at least a portion of the received information via the respective data interface DS1, DS2 or DS3 and to receive additional information for the generation of the respective transmit vector V1 or V2.

According to the first mode of the method according to the invention, the transmit vector V2 (S2; m, n) is formed by the functional unit H2 of the second radio node F2 on the basis of the receive vector $R_2$ (S1; m, n).

During a second step S2, the second radio node F2 transmits a response signal TA (S2; m, n) based on the transmit vector V2 (S2; m, n) by means of the transmitter unit TX. During the second step S2, by means of the receiving units RX, the first radio node F1 of the cell E1 and the extra radio node FE receive the response signal TA sent by the second radio node F2 after transmission via the propagation medium PM as the receive vector $R_1$ (S2; m, n) and $R_3$ (S2; m, n). The transmission via the propagation medium PM is illustrated by the functions $G_{12}$ ($j\omega_p$; S1) and $G_{32}$ ($j\omega_p$; S1).

As illustrated in FIGS. 2, 3 and 4, the respective frequency generator of the radio nodes F1 and F2 of the cell E1 and of the extra radio nodes FE first generates a signal of the frequency $f_p$, $f'_p$, $f''_p$ with $\omega_p = 2\pi * f_p$ ($\omega'_p$, $\omega''_p$ analog) with (p=1), wherein the signal of the frequency generator of the radio nodes F2 and FE is delayed by the time offsets $T_{offs, 21}$ and $T_{offs, 31}$. There is also a static phase offset $\Delta\varphi 21$ or $\Delta\varphi 31$ between the radio nodes F1 and F2 or the first radio node F1 and extra radio node FE. This is not critical for the further considerations and is only mentioned for the sake of completeness. For purposes of further consideration, the frequencies $f_p$, $f'_p$, $f''_p$ are considered to have the same value. It is assumed that appropriate frequency offset corrections are carried out (if necessary).

In the first step S1 m=0, n=0, 1, 2, the signal vector V1 (S1; m, n) is converted to the high frequency position by the first radio node F1 using an up-mixer and the signal of the frequency generator of the frequency $f_p$. The result is the continuous-time initial signal TI at a first carrier frequency $\omega_p$ (p=1) with a signal vector V1 (S1; m, n) that is coupled into the propagation medium PM. The initial signal TI assumes the value TI (S1; m, n) at the times $T1 = (n-1)*T_{MU} + (m-1)*T_{SF}$. To illustrate, let us assume the signal vector V1 (S1; m, n)=1, i.e., the first radio node F1 sends a reference signal with a carrier frequency $\omega_p$ with p=1 as the initial signal TI.

During a first reception period in the first step S1 with m=0, n=0, 1, 2, the second radio node F2 of the cell E1 and the extra node FE respectively determine in each case the receive vectors $R_2$ (S1, m, n) or $R_3$ (S1; m, n) by mixing the received HF signal with the signal of the frequency generator of the frequency $f'_p$ or $f''_p$ that is shifted in time by $T_{\mathit{offs},21}$ or $T_{\mathit{off},31}$ with respect to the generator signal of the first radio node F1.

The position of the receive vectors $R_2$ (m, n) or $R_3$ (m, n) in the complex plane is first determined by the internal time reference or the respective timer Z(T2) or Z(T3) with T2=n*$T'_{MU}$+m*$T'_{SF}$ or T3=n*$T''_{MU}$+m*$T''_{SF}$.

The corresponding receive vectors $R_2$ and $R_3$ reflect the transfer behavior relative to the initial signal TI of the first radio node F1 of the cell E1 and contain the transfer functions $G_{12}(j\omega)$ and $G_{13}(j\omega)$ of the propagation medium PM on the frequency $\omega=2\pi*f_p$ and the time and phase offset $T_{\mathit{offs},\,12}$ and $T_{\mathit{offs},\,13}$ or $\Delta\varphi_{12}$ and $\Delta\varphi_{12}$.

On the basis of the receive vector $R_2$ (m, n), taking into account a possible parameterization, a baseband signal vector $V_2$ is formed according to $V_2$ (m, n+3)=$H_2$ ($R_2$ (m, n), . . . ) via the data interface DS2 with the aid of the functional unit $H_2$ and is transmitted as a signal vector $V_2$ to the transmitter unit TX of the second radio node F2.

In the second step S2 m=0, n=3, 4, 5, a transmission signal TA (S2; m, n) with the frequency $f'_p$ is generated by the second radio node F2 of the cell E1 from the determined baseband vector V2 (S2; m, n) using a mixer and the frequency generator and is coupled out as a response signal TA into the propagation medium PM.

The signal vector V2 (S2; m, n) for m=0, n=3, 4, 5 is thereby formed from the receive vector $R_2$ (S1; m, n) m=0, n=0, 1, 2, with the aid of the function H2 ($R_2$ (m, n), . . . ) and thus at least from a portion of the receive vector $R_2$. Possible functions H for the formation of the response signal V2=H2 ($R_2$) are H2 ($R_2$)=$R_2$, H2 ($R_2$)=exp (j*phase ($R_2$)) or H2 ($R_2$)=1/$R_2$, H2 ($R_2$)=conj ($R_2$) and H2 ($R_2$)=exp (−j*phase ($R_2$)).

In the step S2, during a second reception period m=0, n=3, 4, 5, the first radio node F1 of cell E1 and the extra radio node FE respectively determine a receive vector $R_1$ (S2; m, n) or $R_3$ (S2; m, n) with m=0, n=3, 4, 5, wherein the position of the receive vector $R_I$ is evaluated in each case with respect to the internal time reference of the respective timer Z(T1), Z(T2) or Z(T3). For this purpose, the received HF signals of the frequency $f'_p$ are converted to the baseband position using a mixer and the respective signal of the respective frequency generator of the frequency $f_p$ or $f'_p$.

The corresponding receive vectors $R_1$ and $R_3$ reflect the transfer behavior relative to the response signal TA of the second radio node F2 of the cell E1 and contain the transfer functions $G_{12}$ (j$\omega$) and $G_{32}$ (j$\omega$) of the propagation medium PM on the frequency $\omega=2\pi*f_p$ and the time and phase offsets $T_{\mathit{offs},\,12}$ and $T_{\mathit{offs},32}$ or $\Delta\varphi_{12}$ and $\Delta\varphi_{32}$.

According to the selection of the function H2 in the second radio node F2 of the cell E1 for the formation of the vector V2, special properties of the measurement result can be achieved. For example, the resulting receive vectors $R_1$ (j$\omega_p$) for H2 ($R_2$)=$R_2$, H2 ($R_2$)=exp (j*angle ($R_2$)) are independent of the time offset and form the essential properties of the circulation channel transfer function (2WR) $G_{2WR}$ (j$\omega$)=$G_{21}$ (j$\omega$)*$G_{12}$ (j$\omega$) between the two radio nodes F1 and F2 of the cell E1. Radio channels are usually reciprocal, so that $G_{21}$ (j$\omega$)=$G_{12}$ (j$\omega$).

If the function H2 becomes H2 ($R_2$)=1/$R_2$, H2 ($R_2$)=conj ($R_2$) and H2 ($R_2$)=exp (−j*angle (R2)) through one of the functions, then the time offset $T_{\mathit{offs},\,12}$ can be determined from the measurement result. The receive vectors $R_3$ (m, n) are dominated by the already introduced transfer functions of the path difference and the accumulated path, or by differences in time offsets or accumulated time offsets and their combinations.

A measurement cycle, which in the exemplary embodiment comprises a first step S1 and a second step S2, is repeated several times, wherein with each repetition, the carrier frequency $\omega_p$, $\omega'_p$ and $\omega''_p$ is selected within a predetermined frequency range according to the corresponding requirements. In the illustrated exemplary embodiment, the carrier frequency $\omega'_p$ of the second radio node F2 and the carrier frequency $\omega''_p$ of the third radio node correspond to the first carrier frequency $\omega_p$ of the first radio node F1. With each measurement cycle, m is incremented and $\omega_p$ is selected according to the requirements. In the case of a frequency sweep, $\omega_p$ is increased by $\omega_{\mathit{step}}$ with each measurement cycle.

There is always a step delay $T_{SV}$, $T'_{SV}$ or $T''_{SV}$ between the first transmission action and the first reception action or vice versa. This way, influences or interferences through a settling process of the radio nodes are avoided. The step delay $T_{SV}$ is accordingly greater than a settling time. At the same time, it should be noted that the relationships presented assume a settled steady state. For this reason, these stationary areas of the measurement cycle are delimited by corresponding guard areas or step delays. Signal vectors determined in the transition areas $T_{SV}$ can only be used with restrictions in the sense of the method. For the case shown, this applies to the vectors $R_1$ (m, n), $R_2$ (m, n), $R_3$ (m, n) with n=0, 3 for all m.

For the implementation of the method according to the exemplary embodiment shown, at least one valid receive vector per radio node of cell E1 is required per measurement cycle and at least one further receive vector is included for each extra node FE operating in the receive mode.

As a result of the measurement cycle, at least one complex signal vector is created for every send/receive direction. The entirety of the signal vectors over the frequencies used corresponds to a discrete sampling in the frequency domain. This is also summarized in a vector $L_{ij}$ (j$\omega$)=[$L_{ij}$ (j$\omega_1$), . . . , $L_{ij}$ (j$\omega_p$))]$^T$ ($^T$ stands for transposed), as shown in FIG. 1, wherein i is the index of the radio node that receives the signal vector and j is the index of the cell's radio node that has transmitted the associated transmit signal. If only one receive vector is available per frequency and reception process and link, then in the simplest case $L_{ij}$ (j$\omega_p$)=$R_i$ (m, n), wherein m is determined by the frequency $\omega p=2\pi*f_p$ to be used and n indexes the corresponding vector in which the radio node Fj of the cell E1 has sent the corresponding transmission signal at the same time.

With the help of a transformation to the time domain via an iFFT (inverse Fourier transform), the corresponding impulse response is created.

If $T_{MU}$ is an integer multiple of the iFFT time window, the offsets of the step control have no direct influence on the result of the iFFT. The determined receive vectors $L_{ij}$ (j$\omega$) are then dependent only on the transfer behavior of the propagation medium and the time offset between the participating nodes.

If the propagation behavior is to be dominated by a signal path, then the impulse response has only a peak value. The time $T_{ij,meas}$ assigned to this peak value is only dependent on the group delay of the corresponding path and the time offset between the corresponding radio nodes. This expansion behavior will be the focus of further considerations to illustrate the relationships. It is understood that the propagation behavior is usually influenced in several ways. Accordingly, these must be extracted with multipath analysis methods from the vectors $L_{ij}(j\omega)$.

Figure 5:
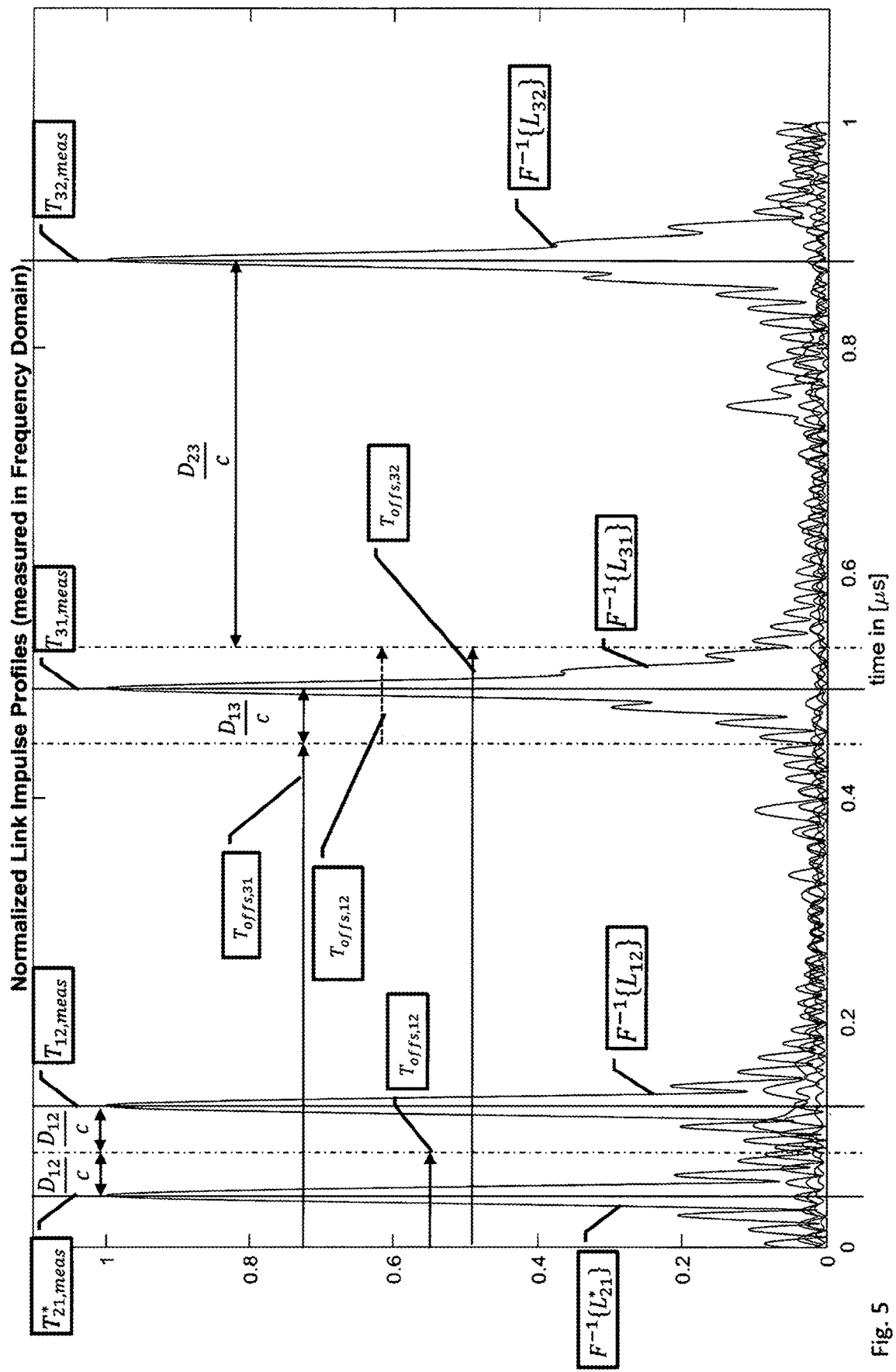
FIG. 5 shows a representation of signal vectors converted to the time domain.

FIG. 5 shows measurement results of the radio nodes F1, F2 and FE for the first embodiment of the method according to the invention for radio measurement applications. The impulse responses in the time domain, which were derived by means of reverse Fourier transform $F^{-1}\{\ \}$ from the receive vectors $F^{-1}\{L_{12}(j\omega)\}$, $F^{-1}\{L_{21}*(j\omega)\}$, $F^{-1}\{L_{32}(j\omega)\}$, $F^{-1}\{L_{31}(j\omega)\}$. The temporal position of the corresponding peak values $T_{12,meas}$, $T*_{21,meas}$, $T_{32,meas}$ and $T_{31,meas}$ was also marked.

For the time $T_{ij,meas}$ assigned to the extracted peak values, the following shall apply: $T_{ij,meas} = T_i - T_j + D_{ij}/c$, wherein c represents the speed of light. With the time offset $T_{off,ij}$, $T_{ij,meas} = T_{offs,ij} + D_{ij}/c$ or $T_{ij,meas} = -T_{offs,ji} + D_{ij}/c$. If one chooses the conjugate complex representation $L_{ij}*(j\omega)$ for the transformation instead of $L_{ij}(j\omega)$ and transforms it to the time domain, then the resulting impulse responses are symmetrical to the time offset between the two radio nodes.

From the above relationships, it can be shown that $T_{12,meas}$ and $T*_{21,meas}$ are symmetrical to the time offset $T_{offs,12} = (T_{12,meas} + T*_{21,meas})/2$, wherein the difference $T_{12,meas} - T_{offs,12}$ and $T_{offs,12} - T*_{21,meas}$ corresponds to the transit time $t_g = D_{21}/c$ that is required for the distance $D_{12}$. The distance $T_{12,meas} - T*_{21,meas}$ corresponds to the circulation time for the route from the first radio node F1 to the second radio node F2 and back, which is also referred to as the 2WR circulation trip time and equals $2*D_{12}/c$. Thus, a measurement process allows for the determination of the distance and the time offset between the radio nodes F1 and F2 of the cell E1.

The measurement results $T_{32,meas}$ or $T_{31,meas}$ are to the right of the assigned time offset $T_{offs,32}$ or $T_{offs,31}$.

The use of the measurement results $T_{32,meas}$ or $T_{31,meas}$ to determine further time offsets and positions will now be explained. Different cases are considered.

Case A1: Is characterized in that all distances $D_{13}$, $D_{23}$, $D_{12}$ between the radio nodes F1, F2 and FE are known. Then, all the time offsets $T_{offs,12} = T_{12,meas} - D_{12}/c$, $T_{offs,31} = T_{31,meas} - D_{13}/c$ and $T_{offs,32} = T_{32,meas} - D_{32}/c$ result. Since $D_{12}$ can also be extracted directly from the measurement results, this value need not be known. A comparison of the extracted value with the real value for $D_{12}$ allows for the derivation of additional parameters, e.g. for quality control.

This configuration allows for the determination of time offsets of extra radio nodes FE, which only operate in the receive mode and therefore are not part of the cell E1 and are located in a known position.

Case B1: If the cell E1 consists of a first radio node F1 operating as a reference radio node with a known position P1 and a second radio node F2 operating as a tag, which is mobile or whose position is not known, then the extra node FE can serve as a further reference radio node, provided that the extra radio node FE is arranged at a known position.

In this case, if $D_{13}$ is known, then the distance $D_{12}$ and the time offset $T_{offs,12}$ can be determined directly from the measurements $T*_{21,meas}$ and $T_{12,meas}$ as is for case A1. With knowledge of $D_{13} = D_{31}$, the time offset $T_{offs,31} = T_{31,meas} - D_{31}/c$ can be determined with the aid of $T_{31,meas}$. The time offset $T_{offs,32}$ results from the circulation condition $T_{offs,32} = T_{offs,31} + T_{offs,12}$ to $T_{offs,32} = (T_{31,meas} - D_{31}/c) + (T_{12,meas} + T*_{21,meas})/2$. The distance $D_{23}$ results with the aid of $T_{32,meas}$ to $D_{23} = c*(T_{32,meas} - T_{offs,32})$ and thus to $D_{23} = C*(T_{32,meas} - (T_{31,meas} - D_{31}/c) - (T_{12,meas} + T*_{21,meas})/2)$. This makes it possible to determine two distances to the tag radio node within a measurement run, in this case the second radio node F2 of cell E1, and to determine the time offsets between all nodes of the arrangement.

By providing additional extra radio nodes FE which also only operate in the receive mode, the number of distances that can be measured within a measurement cycle or a measurement run can be expanded. A further distance value is created for each extra radio node FE. It is of great advantage that the number of steps within a measurement cycle does not have to be expanded. Thus, by adding extra radio nodes FE, the measuring speed can be increased significantly.

For the position determination of a mobile radio node, at least 3 distances to different fixed reference nodes are required. In real propagation environments, 5 to 6 distance measurements are likely necessary for reliable position determination, which can be obtained in one measurement run with a known position, for example, with a stationary radio node F1 as part of the cell E1 and five extra nodes FE1, FE2, FE3, FE4 and FE5.

Case C1: In this case, the two radio nodes F1 and F2 of the cell E1 are both arranged at known positions P1 and P2 and thus serve as reference radio nodes. The distance $D_{12}$ is thus known. From the measured values $T*_{21,meas}$ and $T_{12,meas}$, $D_{12}$ can also be determined for quality assessment. The determination of the $T_{off,12}$ is necessary for the further process. This is done as described in the previous examples.

A direct determination of further distances is not possible. However, the measurement results $T_{12,meas}$, $T*_{21,meas}$, $T_{32,meas}$ and $T_{13,meas}$ can be used for the determination of distance differences $D^3_{12(-)} = D_{31} - D_{32}$. It can be shown that the distance difference $D^3_{21(-)} = D_{32} - D_{31}$ can be calculated from the measured values. This results, for example, from $D^3_{21(-)} = c*(T_{32,meas} - T_{31,meas} - T_{offs,12})$. Analogously, the derivation of accumulated paths is also possible.

When determining distance differences, the arc for time difference measurement can be closed.

Figure 6:
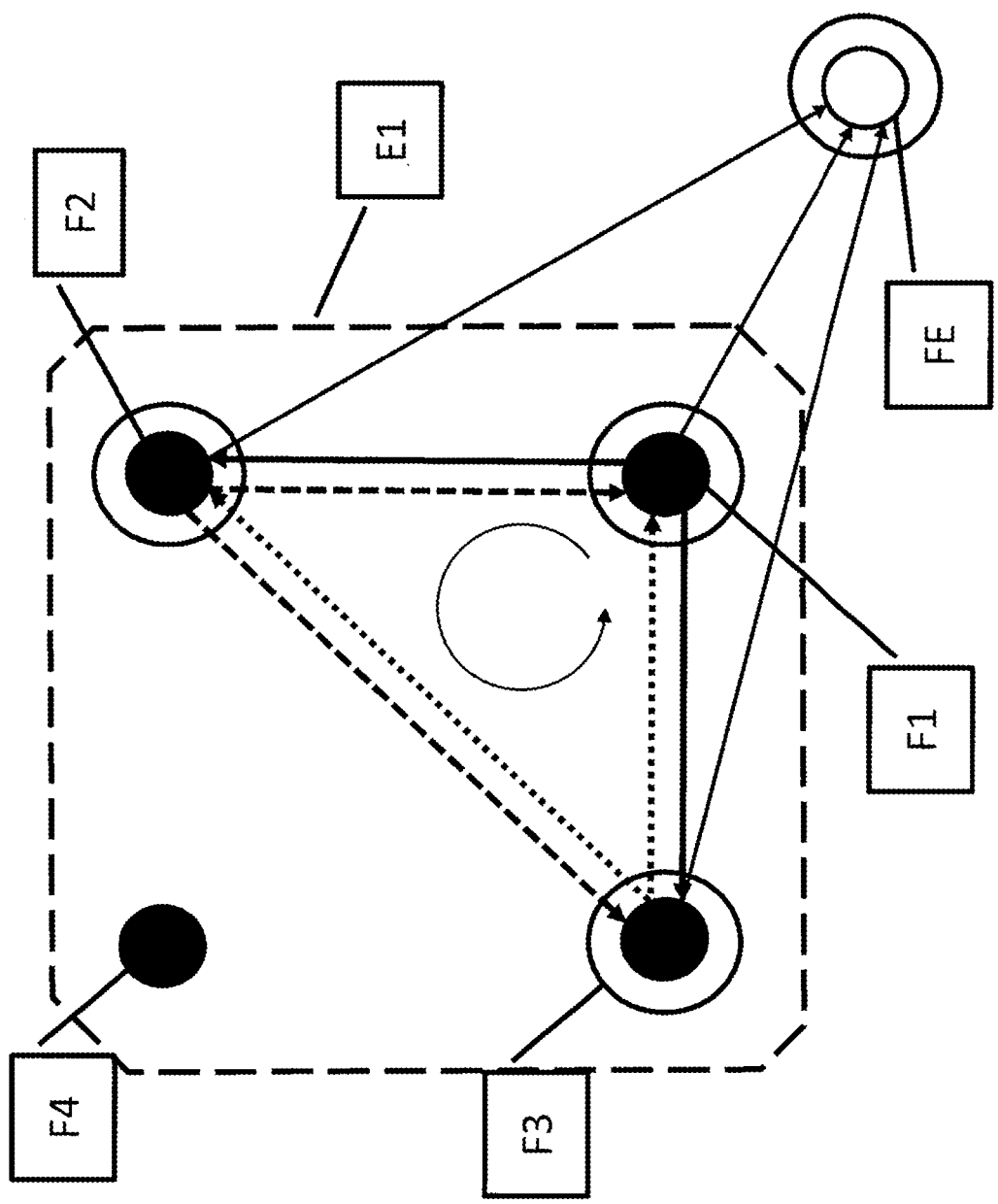
FIG. 6 shows an extension of the exemplary embodiment.

FIG. 6 shows an extension of the cell E1 by further reference radio nodes, namely, by a third radio node F3 and a fourth radio node F4. The other radio nodes F3 and F4 of the cell E1 are also arranged at a known position. According to the shown exemplary embodiment, during a measurement cycle only three of the four radio nodes of the cell E1 are active, wherein the measurement cycle consists of three steps S1, S2 and S3. At least during the shown measurement cycle, the fourth radio node F4 of the cell E1 is not active.

In each step, one of the three active radio nodes of the cell E1 operates in the transmit mode for transmitting the initial signal or a first response signal or a second response signal. The radio nodes of the cell E1 each calculate their time offset and transmit this via the data interfaces also to the mobile extra radio nodes (tag radio nodes), so that the extra radio nodes determine several distance differences to the different pairs of radio nodes of the cell E1 and therefrom, determine the position using known algorithms.

The special feature of this use case is that with a limited set of reference radio nodes, which together form the cell E1, an arbitrary number of extra nodes FE can determine their position using differences in distance. These extra nodes FE only have to receive and evaluate the corresponding transmission signals and receive the determined time offsets of the radio nodes of the cell E1 via the respective data interface DS. The data interfaces can also be wireless. The procedure is reminiscent of GPS systems. In the presented method, the nodes of the cell do not need to be elaborately synchronized and do not require any highly stable time references, such as the GPS satellites, in order to be able to determine their respective position using distance differences.

Figure 7:
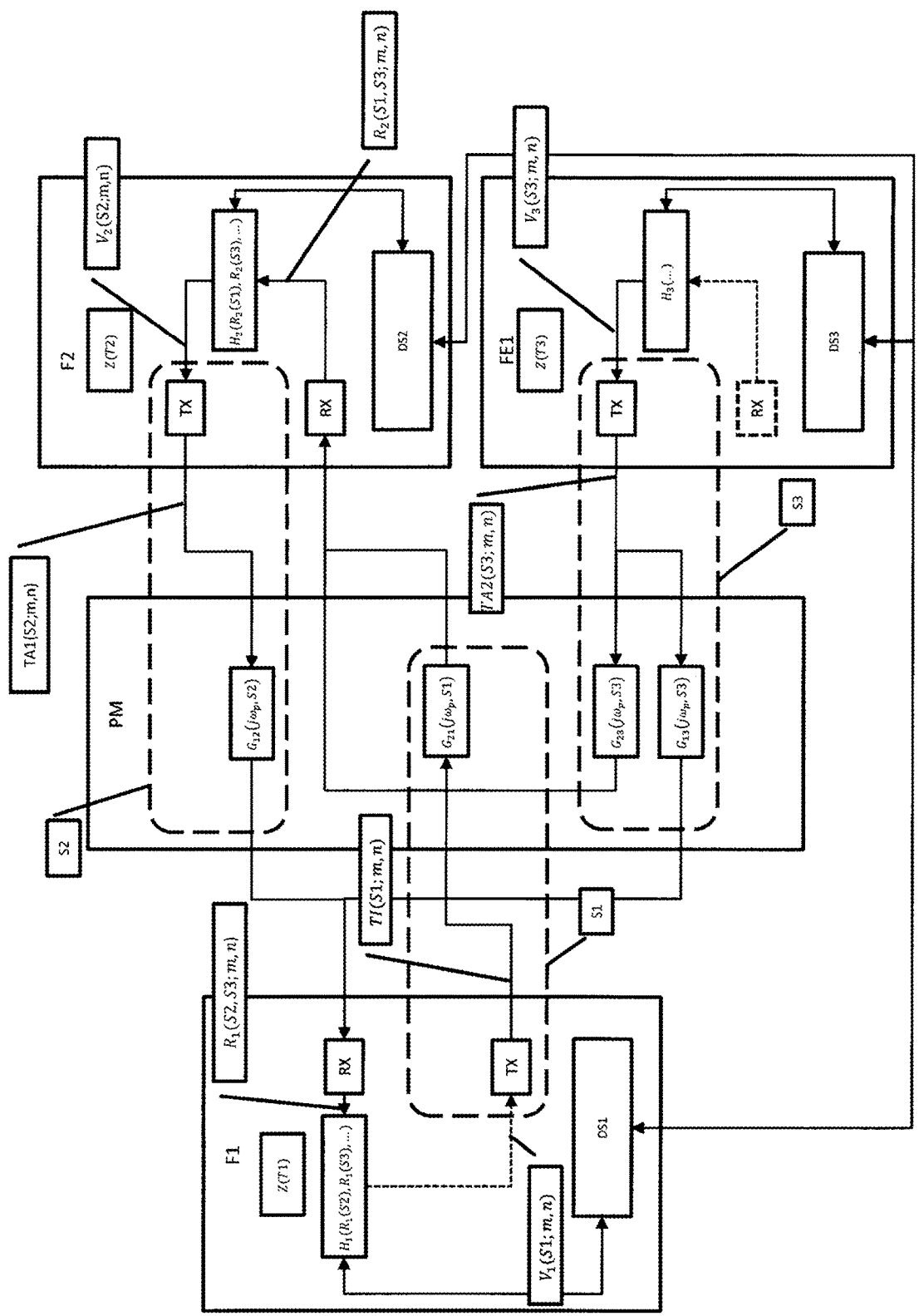
FIG. 7 shows an arrangement of three radio nodes for radio measuring applications according to an exemplary embodiment.
Figure 8:
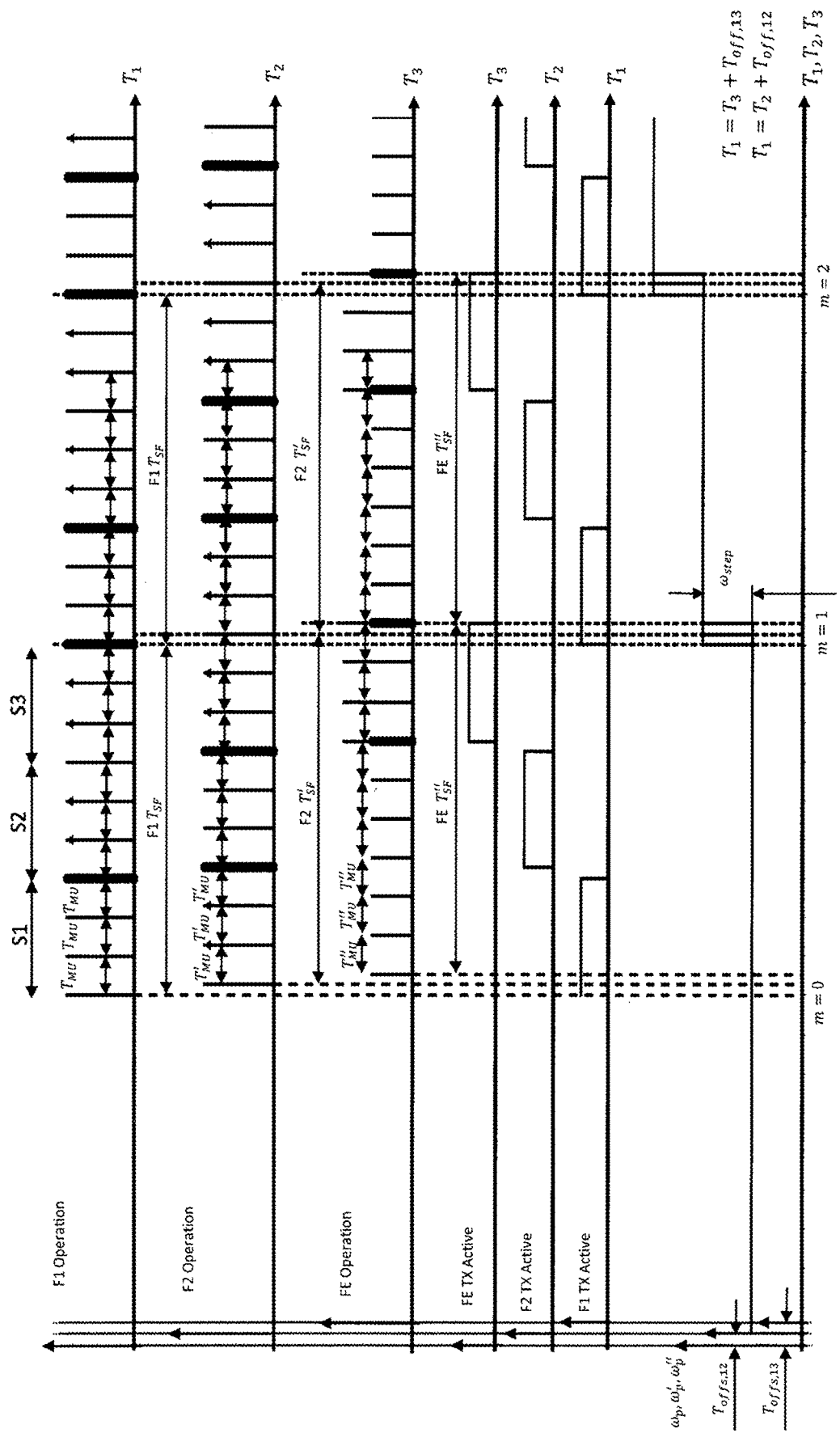
FIG. 8 shows a temporal flowchart according to the exemplary embodiment.
Figure 9:
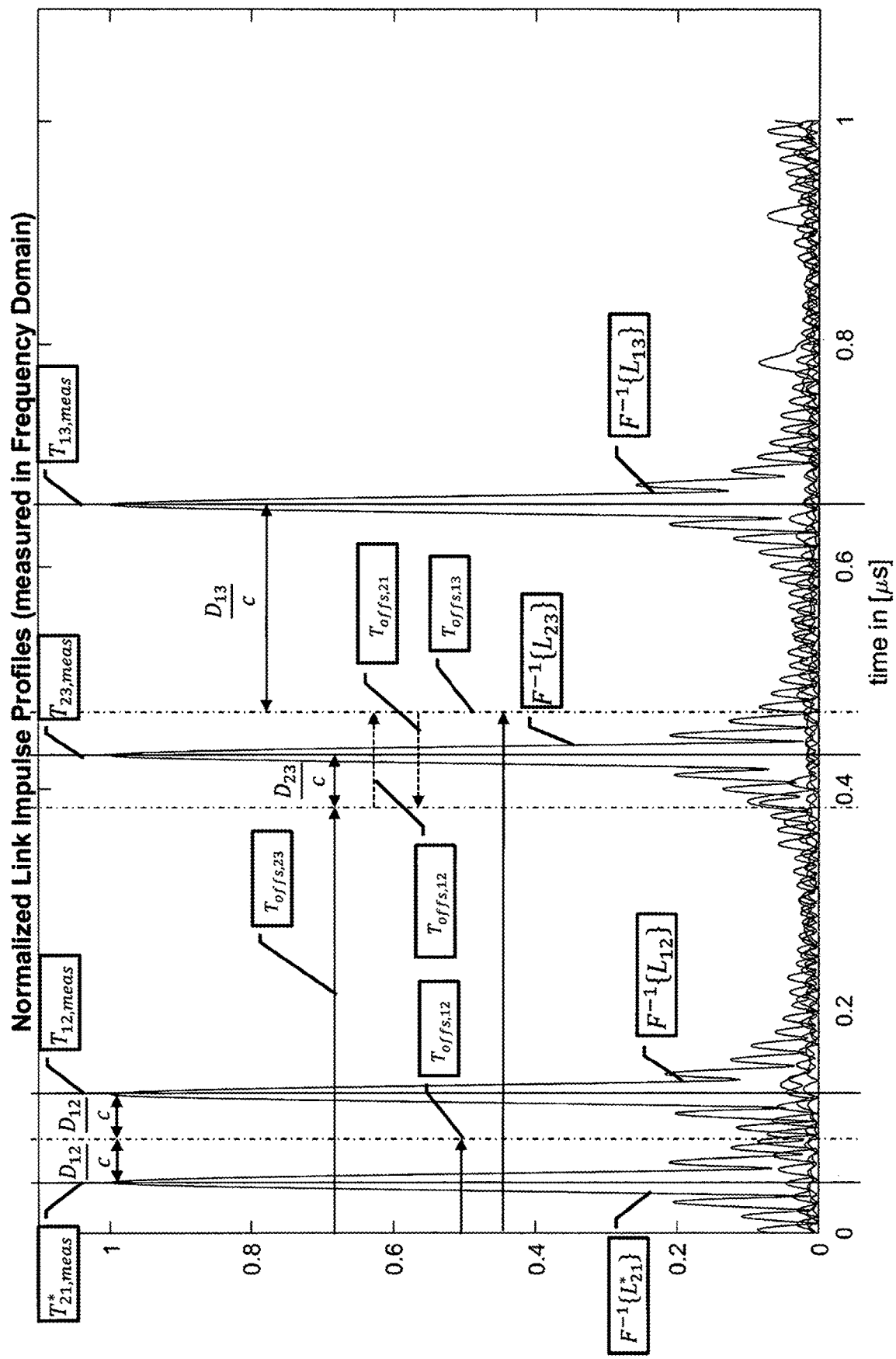
FIG. 9 shows a representation of signal vectors converted to the time domain.

According to a second embodiment, the extra node FE operates exclusively in the send mode, so there are some similarities and differences. The corresponding structure of the arrangement of function blocks is shown in FIG. 7. FIG. 8 shows a form of implementation in a time flow diagram. FIG. 9 illustrates the relationship between the determined impulse responses using measurement results. In the following, the differences are explained, and the advantages of individual procedures are identified.

In the exemplary embodiment shown, the extra radio node has a transmitting unit TX. A receiving unit is optional or is not required, since the extra radio node only operates in the transmitting mode during the measurement cycle. Since both the radio nodes F1, F2 of the cell E1 and the extra radio node FE alternate in sending signals, the measurement cycle expands to three steps S1, S2 and S3. The order in which the individual radio nodes F1, F2 and FE transmit is of secondary importance for the method. As shown in FIGS. 7 and 8, the first radio node F1 of the cell E1 transmits in the step S1, the second radio node F2 of the cell E1 transmits in the step S2 and the extra radio node F3 transmits in the step S3. In FIG. 8, therefore, the measurement cycle has been expanded to $n_{max}=9$.

Thus, a total of two receive vectors (in step S1 for n=1, 2 in step S2 for n=4, 5 and in step S3 for n=7, 8) are created per step in the receiving radio nodes. The indices/time windows n=0, 3, 6 are reserved for systems transitions and settling processes. The steps S1 and S2 thus resemble the steps S1 and S2 of the method illustrated in FIGS. 3, 4 and 5, with the difference that the extra node FE does not receive any signals during these steps and thus limits its actions to maintaining the predefined time behavior. In step S3, the extra node FE transmits a vector V3 (S3; m, n) with the aid of a frequency generator, up-mixer, as a transmission signal TA2 (S3; m, n) at the respective frequency $\omega_p$.

According to an alternative embodiment, the extra node FE modifies the vector V3 according to parameters received by the extra radio node FE via the data interface DS3. As long as the parameters are known to all participating radio nodes, all radio nodes can adapt their behavior accordingly.

All of the statements made prior about the treatment of the receive vectors can also be applied to the arrangement with an extra radio node operating exclusively in transmit mode. Other application properties result in connection with extra nodes that exclusively transmit. However, the basic relationships remain the same.

FIG. 9 shows measurement results of the radio nodes F1, F2 and FE for the second embodiment of the method according to the invention for radio measuring applications. Shown are the impulse responses in the time domain, which have been derived by means of inverse Fourier transform $F^{-1}\{\ \}$ from the receive vectors $F^{-1}\{L_{12}(j\omega)\}$, $F^{-1}\{L_{21}*(j\omega)\}$, $F^{-1}\{L_{23}(j\omega)\}$, $F^{-1}\{L_{13}(j\omega)\}$. The temporal position of the respective peak values $T_{12,meas}$, $T^*_{21,meas}$, $T_{23,meas}$ and $T_{13,meas}$ was also highlighted. The use of the measurement results to support the determination of time offsets and positions will now be explained. Various cases are considered.

Case A2: If all distances $D_{13}$, $D_{23}$, $D_{12}$ are known, then all the time offsets $T_{offs,\ 12}$, $T_{offs,\ 13}$ and $T_{offs,23}$ can be determined. Since $D_{12}$ can also be directly extracted from the measurement results, this value need not be known. A comparison of the extracted value with the real value for $D_{12}$ allows for the derivation of additional parameters.

This configuration allows for the time offsets of extra radio nodes FE operating only in transmit mode to be determined.

Case B2: If the cell E1 consists of a first radio node F1 with a known position and a second radio node F2 with an unknown position, then the extra node FE arranged at a known position can serve as a reference radio node. In this case, $D_{13}$ is known and $D_{12}$ as well as the time offset $T_{offs,\ 12}$ can be determined directly from the measurements $T_{*21,meas}$ and $T_{12,meas}$. With knowledge of $D_{13}$, the time offset $T_{offs,\ 13}$ can be determined with the aid of $T_{13,meas}$. The time offset $T_{offs,23}$ results from the circulation condition $T_{offs,23}=T_{offs,\ 13}-T_{offs,\ 12}$. The distance $D_{23}$ results with the aid of $T_{23,meas}$ to $D_{23}=c^*(T_{23,meas}-T_{offs,23})$ corresponding to $D_{23}=c^*(T_{23,meas}-(T_{13,meas}-D_{13}/c)+(T_{12,meas}+T^*_{21,meas})/2)$. It is therefore possible to determine two distances between the second radio node F2 and the other radio nodes within one measurement run and to determine the time offsets between all radio nodes of the arrangement.

By the provision of further extra radio nodes FE, each also operating in transmit mode and each arranged at a known position, the number of distances that can be measured within one measurement run can be expanded. A further distance value is created for each extra radio node FE. However, since further steps within the measurement cycle have to be introduced for each additional extra FE, the speed gain for the position determination as compared to case B1 is only moderate.

Figure 10:
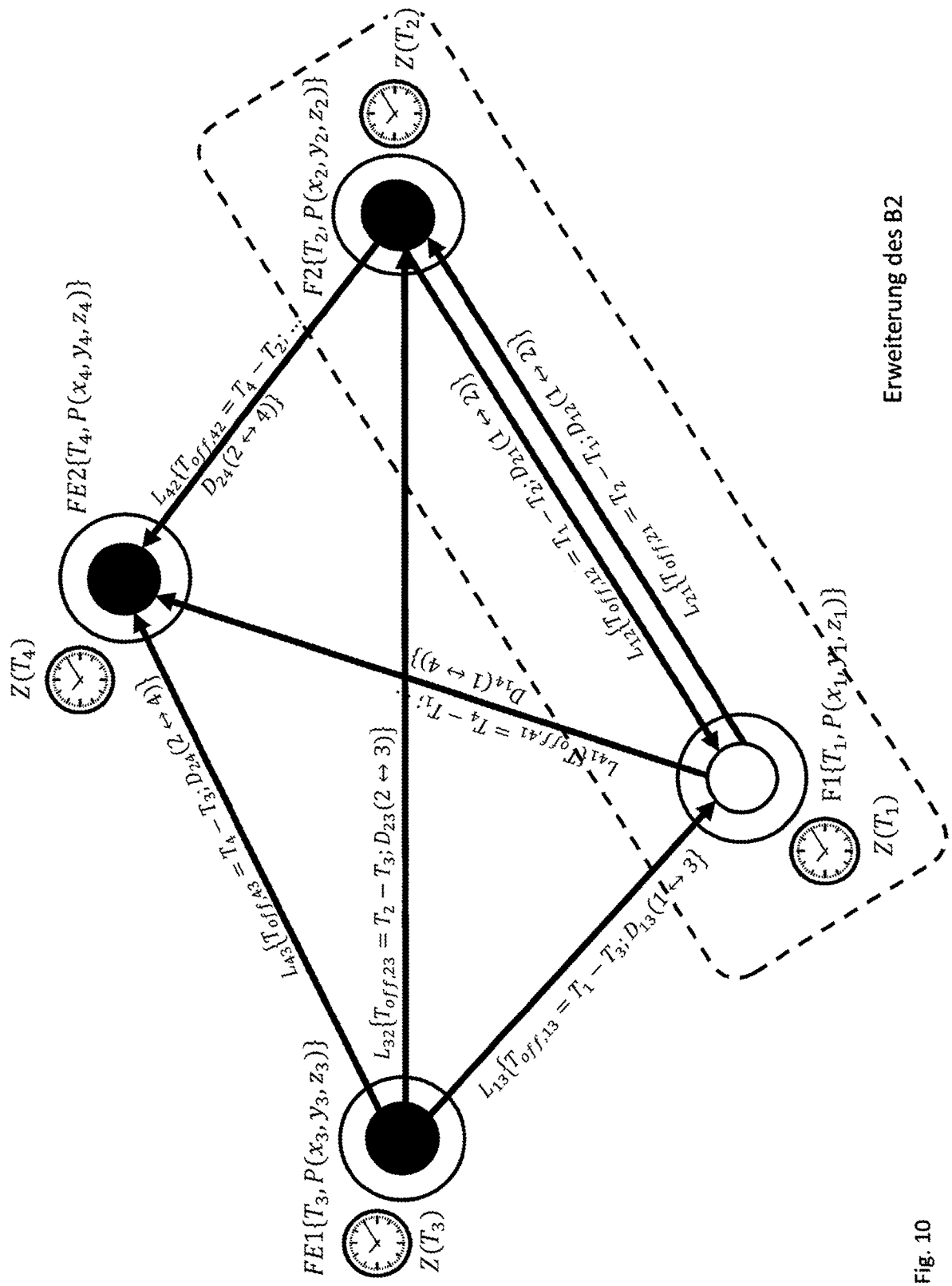
FIG. 10 shows an expansion of the exemplary embodiment.

This embodiment variant for a second extra radio node FE2 is shown in FIG. 10, wherein the second extra radio node FE2 is arranged at a known position like the first extra radio node FE1, but in contrast to the extra radio node FE1, it only operates in the receive mode. For illustration purposes, the radio nodes, whose position is known, are represented by a black filled circle.

Case C2: In this case, the two radio nodes F1 and F2 of the cell E1 are each arranged at a known position and thus serve as reference radio nodes. The distance $D_{12}$ is known and can also be determined, for example for quality assessment, from the measurement results. From the measured values $T^*_{21,meas}$ and $T_{12,meas}$, first the time offset $T_{offs,\ 12}$ is determined. A direct determination of further distances is not possible. However, the measurement results $T_{12,meas}$, $T^*_{21,meas}$, $T_{23,meas}$ and $T_{13,meas}$ can be used for the determination of distance differences $D^3_{12(-)}=D_{13}-D_{23}$. It can be shown that the distance difference $D^3_{12(-)}=D_{13}-D_{23}$ can be calculated from the measured values. According to the procedure shown under C1, this results, for example, in $$D^3_{12(-)}=c^*(T_{13,meas}-T_{23,meas}-(T_{12,meas}+T^*_{21,meas})/2)$$

Analogously, it is also possible to derive accumulated paths. The arc for time difference measurement can be closed when determining distance differences.

If the cell E1 is now expanded by other radio nodes (reference radio nodes) respectively arranged at a known position, which in the current operation perform the series of measurement cycles and also evaluate the transmission signal of the extra radio nodes FE, then the number of measured distances can be increased per unit time. Ultimately, all radio nodes operating in the transmit mode need a transmission time window. The speed gain to be expected when expanding the cell E1 is therefore rather moderate.

Figure 11:
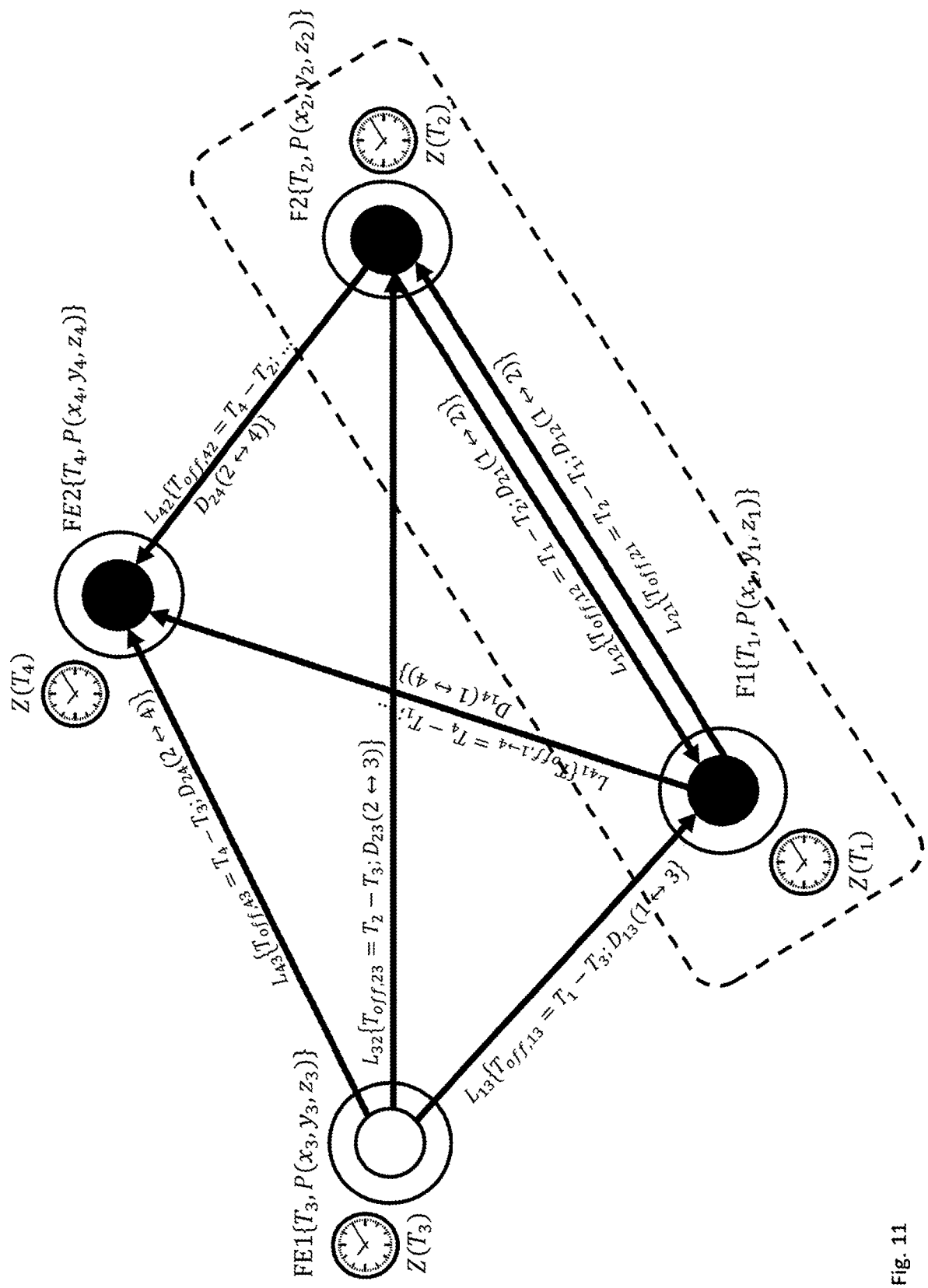
FIG. 11 shows an alternative expansion of the exemplary embodiment.

Case D2: This is an expansion of the case C2 in terms of expanding the arrangement by additional extra radio nodes, as shown in FIG. 11, wherein the additional extra radio nodes each operate exclusively in the receive mode and are each arranged at a known position and thus serve as reference nodes. For illustration purposes, the radio nodes whose position is known are represented by a black filled circle.

The determined receive signals transmit the additional extra radio nodes via the respective data interface to the other radio nodes and/or a computing unit. According to the relationships in the cases A1 and A2, if the distances between the reference radio nodes are known, all time offsets can be determined. This means that an arrangement with a tag node (first extra radio node FE operating exclusively in the transmit mode) and the two radio nodes F1 and F2 of the cell E1 can be expanded by any number of further extra nodes FE exclusively operating in the receive mode if the other extra nodes FE exchange their results via the data interfaces with all of the other radio nodes. The number of distance differences that can be determined at the same time increases greatly, since with each added extra radio node FE the number of additionally available links is determined by the number of available radio nodes. Theoretically, any number of distance differences can be determined with one measurement run. 5 to 6 distance differences are practically relevant for determining a position.

It is understood that a transformation from the frequency domain to the time domain is complex.

The presented operations for the determination of distances, distance differences and time offsets using $T_{12,meas}$, $T^*_{21,meas}$, $T_{23,meas}$ and $T^*_{13,meas}$ substantially include vector addition, vector subtraction, and scalar multiplication of vectors. These operations should expediently first be carried out in the frequency domain, since a transformation from the frequency domain to the time domain requires a high level of computation and usually generates a larger number of interpolation points. (The iFFT is also helpful for interpolation.) This increased point number must then also be processed accordingly.

Figure 12:
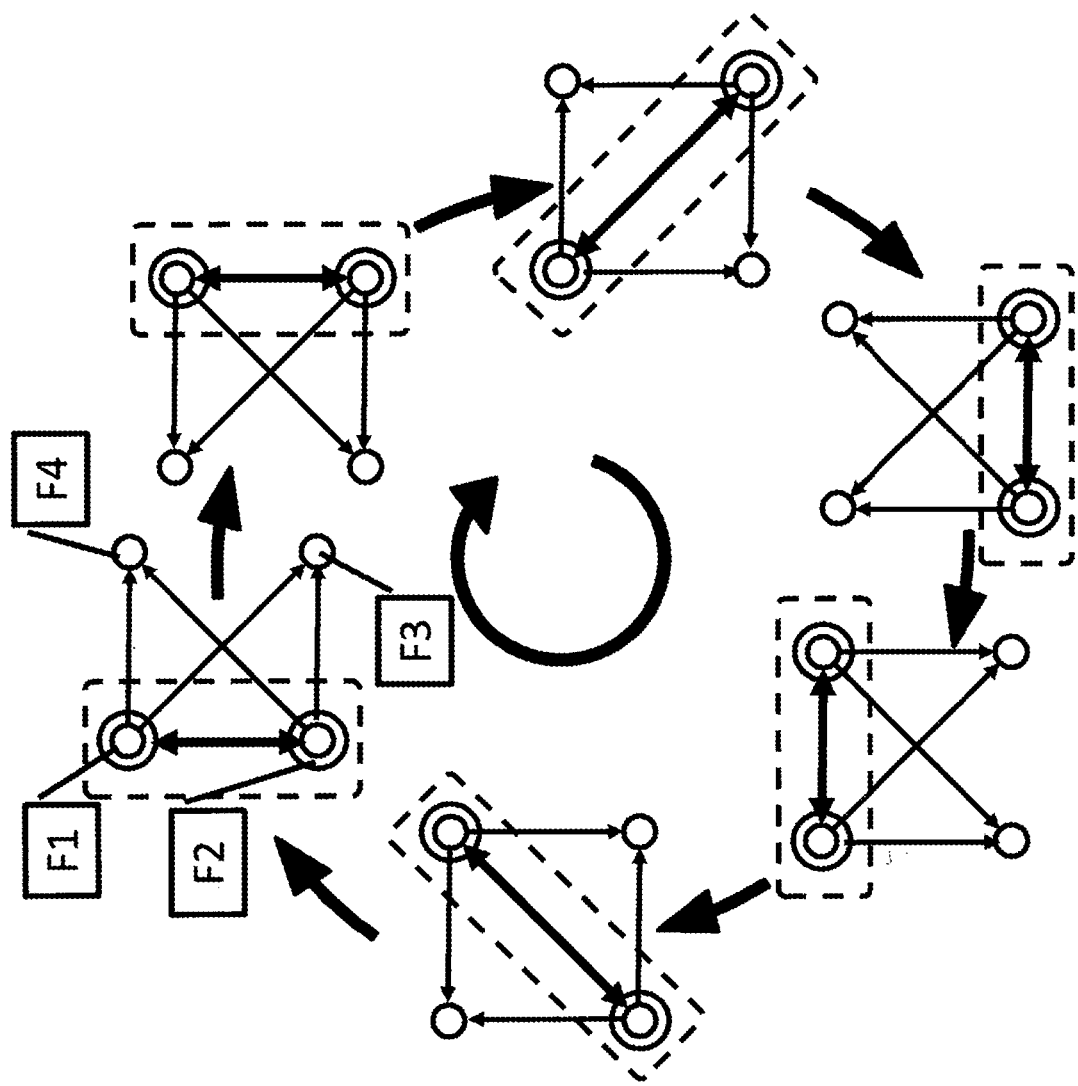
FIG. 12 shows a further exemplary embodiment.

FIG. 12 shows a further embodiment of the method for radio measuring applications according to the invention.

Four stationary radio nodes F1, F2, F3 and F4 are provided, wherein each radio node comprises a transmitter unit TX, a receiver unit RX, a timer.

Successively, always two of the four radio nodes F1, F2, F3 and F4 form the cell E1 and exchange an initial signal $T_I$ and a response signal $T_A$ as part of a measurement cycle, wherein during this measurement cycle the remaining two radio nodes exclusively operate as extra radio node FE in the receive mode and receive the initial signal $T_I$ and the response signal $T_A$.

This embodiment can be used for self-calibration, for example.

With the embodiment shown, it is also possible to monitor the space between the stationary radio nodes. The state of a space (empty, occupied) can be determined, for example, by multipath analysis of the received signals. The multipath analysis also enables the localization of moving objects or the identification of movements in a space between the radio nodes.

This embodiment can also be expanded by further extra nodes that operate exclusively in the receive mode as further reference nodes.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for radio measuring applications having at least three radio nodes, the method comprising:
   performing a measurement cycle, wherein during the measurement cycle at least two radio nodes form a cell, and at least one further radio node is an extra radio node, and wherein the measurement cycle comprises at least two steps, during the measurement cycle at least two radio nodes of the cell operate at least once in one of the at least two steps in a send mode and operate at least once in one of the at least two steps in a receive mode;
   operating, during the measurement cycle, the at least one extra radio node exclusively in a receive mode or exclusively in a transmit mode;
   providing each radio node with its own timer, signal processor, at least one antenna, and a further data interface for data transfer;
   providing a time offset between the timers;
   providing that, during each measurement cycle, at least all the transmission signals of the radio nodes of the cell are mutually coherent;
   transmitting, to initiate the measurement cycle, in a first step, the initial signal with a first carrier frequency by one of the radio nodes in the transmit mode and receiving the initial signal by at least one radio node of the cell in the receive mode;
   changing at least one radio node of the cell from the receive mode to the transmit mode in at least one further step during the measurement cycle, and emitting the response signal with a further carrier frequency, the response signal being received by at least one radio node of the cell in the receive mode;
   sending, during the measurement cycle at least one signal or receiving at least one signal by at least one of the extra radio nodes;
   perfoiining at least two measurement cycles at different carrier frequencies; and
   operating the method either in a first mode or in a second mode,
   wherein, in the first mode, each response signal from the at least one radio node of the cell in the receive mode is formed from at least a portion of the received initial signal or from a portion of a received response signal and at least one transfer function and/or at least one of the time offsets is determined on the basis of the received response signals,
   wherein in the first mode, the radio node changing into the transmit mode determines in each case a complex signal vector from the received initial signal or from one of the received response signals, and the response signal to be transmitted is formed from the complex signal vector or a phase is determined from one of the received response signals and the response signal to be sent is formed using the phase or the inverted phase, and
   wherein, in the second mode, each response signal is formed independently from each received signal, for at least two received initial signals, a receive signal vector is determined retrospectively, and are transmitted by means of the further data interface and at least one transfer function and/or at least one of the time offsets is determined based on the received response signals and the at least two received and transmitted initial signals.

2. The method according to claim 1, wherein at least three radio nodes are provided in the cell, wherein each of the at least three radio nodes transmits in at least one step and receives in all further steps, wherein only one of the radio nodes transmits in each step.

3. The method according to claim 1, wherein all radio nodes of the cell are designed to operate in a receive mode and in a transmit mode and during at least one measurement cycle, at least one of the radio nodes of the cell operates neither in the transmit mode nor in the receive mode.

4. The method according to claim 1, wherein several extra radio nodes are provided.

5. The method according to claim 4, wherein the position of one of the radio nodes within the cell is determined via several measurement cycles.

6. The method according to claim 4, wherein the position of one of the extra radio nodes is determined via several measurement cycles.

7. The method according to claim 1, wherein a measurement run is formed from several repetitions of the measurement cycle and at least one first radio node is part of the cell in at least one first measurement run and in at least one further measurement run operates as an extra radio node and/or at least one further radio node in at least one first measurement run operates as an extra radio node and is part of the cell in at least one further measurement run.

8. The method according to claim 1, wherein all radio nodes are arranged at a predetermined position and the time offsets between the radio nodes are determined from the transfer functions.

9. The method according to claim 1, wherein a measurement run is formed from a number of repetitions of the measurement cycle and at least the send signals of the radio nodes of the cell are each coherent at least during one measurement run or at least during a plurality of measurement runs.

10. The method according to claim 1, wherein in that the measurement run is formed of a plurality of repetitions of the measurement cycle and the first carrier frequency assumes a predetermined value within the frequency domain for each repetition during the measurement run.

11. The method according to claim 1, wherein each additional carrier frequency corresponds to the first carrier frequency or differs from the first carrier frequency.

12. The method according to claim 1, wherein with each repetition of the measurement cycle, an amplitude and/or a phase of the response signal is changed in addition to the carrier frequency of the response signal.

* * * * *